(12) United States Patent
Wang et al.

(10) Patent No.: US 11,606,780 B2
(45) Date of Patent: Mar. 14, 2023

(54) AUGMENTED SIDELINK CONTROL INFORMATION FOR WIRELESS COMMUNICATIONS

(71) Applicant: QUALCOMM Incorporated, San Diego, CA (US)

(72) Inventors: Xiaojie Wang, Hillsborough, NJ (US); Jing Sun, San Diego, CA (US); Junyi Li, Franklin Park, NJ (US); Piyush Gupta, Bridgewater, NJ (US); Jung Ho Ryu, Fort Lee, NJ (US); Sony Akkarakaran, Poway, CA (US); Arumugam Chendamarai Kannan, San Diego, CA (US); Xiaoxia Zhang, San Diego, CA (US); Tao Luo, San Diego, CA (US); Juan Montojo, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 17/125,659

(22) Filed: Dec. 17, 2020

(65) Prior Publication Data
US 2022/0201667 A1 Jun. 23, 2022

(51) Int. Cl.
*H04W 72/04* (2009.01)
*H04W 74/08* (2009.01)
*H04W 72/0446* (2023.01)

(52) U.S. Cl.
CPC ... *H04W 72/0406* (2013.01); *H04W 72/0446* (2013.01); *H04W 74/0816* (2013.01)

(58) Field of Classification Search
CPC ......... H04W 72/0406; H04W 72/0446; H04W 28/26; H04L 5/0094
See application file for complete search history.

(56) References Cited

U.S. PATENT DOCUMENTS

2019/0306835 A1* 10/2019 Hoang .............. H04W 72/0493
2020/0229210 A1 7/2020 Bharadwaj et al.
(Continued)

FOREIGN PATENT DOCUMENTS

WO WO-2019028847 A1 2/2019

OTHER PUBLICATIONS

International Search Report and Written Opinion—PCT/US2021/056994—ISA/EPO—dated Feb. 28, 2022.

*Primary Examiner* — Raj Jain
(74) *Attorney, Agent, or Firm* — Holland & Hart LLP

(57) ABSTRACT

Methods, systems, and devices for wireless communications are described. A transmitting user equipment (UE) may determine a set of resources for sidelink communication with one or more neighboring UEs. The transmitting UE may transmit multiple sidelink control messages to the neighboring UEs indicating the set of resources are reserved for a sidelink data message. The neighboring UEs may receive at least one of the sidelink control messages. A neighboring UE may determine a portion of the resources are reserved for a sidelink data message with the transmitting UE and may transmit or receive the sidelink data message using the portion of the resources. Additionally or alternatively, a neighboring UE may determine the resources are reserved for a sidelink data message between the transmitting UE and another neighboring UE and may select alternative resources for sidelink data messages to may avoid using the reserved resources.

30 Claims, 15 Drawing Sheets

(56) References Cited

U.S. PATENT DOCUMENTS

| | | |
|---|---|---|
| 2020/0236655 A1 | 7/2020 | Bharadwaj et al. |
| 2021/0337512 A1* | 10/2021 | Belleschi ................ H04W 4/40 |
| 2022/0201667 A1* | 6/2022 | Wang ................ H04W 72/0406 |
| 2022/0232530 A1* | 7/2022 | Chae .................... H04W 72/02 |

* cited by examiner

SCI1 Message 310

SCI2 Message 315

ASCI Message 320

Sidelink Shared Channel 325

Sidelink Feedback Channel 340

Gap 345

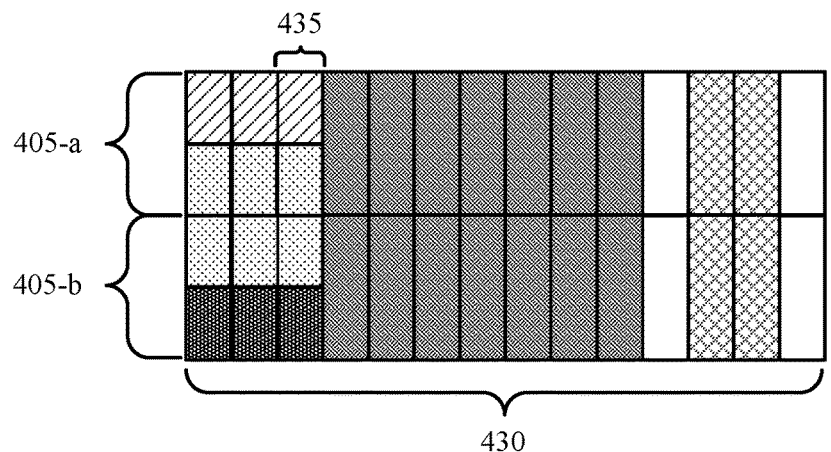
FIG. 4A
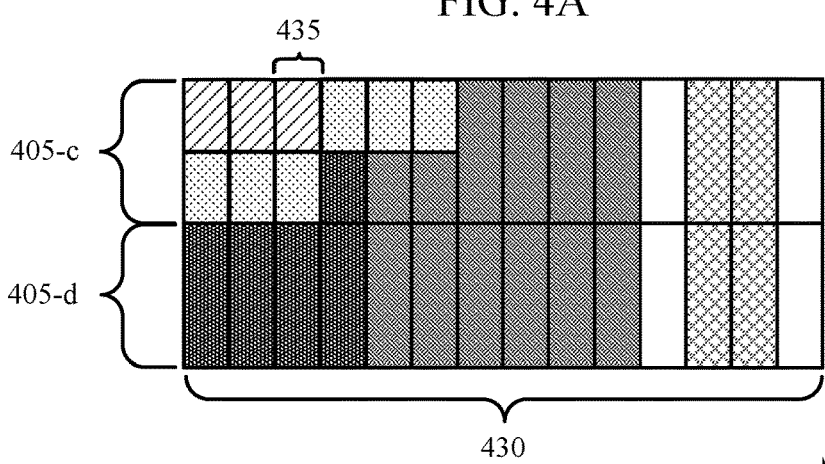
FIG. 4B
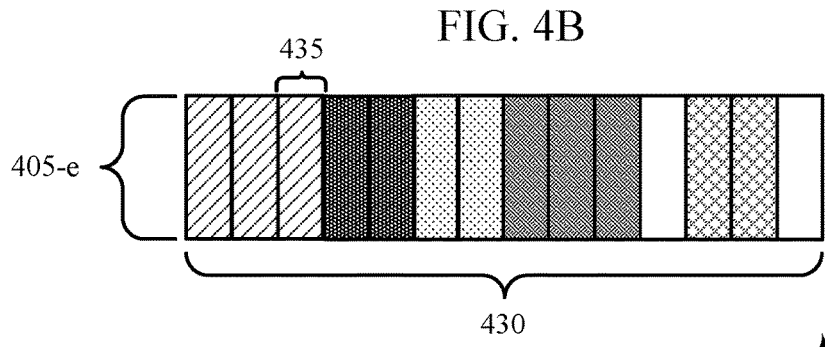
FIG. 4C
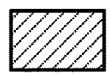 SCI1 Message 410
 Sidelink Shared Channel 425
 SCI2 Message 415
 Sidelink Feedback Channel 440
 ASCI Message 420
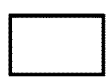 Gap 445

AUGMENTED SIDELINK CONTROL INFORMATION FOR WIRELESS COMMUNICATIONS

FIELD OF TECHNOLOGY

The following relates to wireless communications, including augmented sidelink control information (ASCI) for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may broadcast a control message to neighboring devices to indicate resources that are reserved for transmissions by the UE. In some cases, a neighboring device may not receive the control message from the UE (e.g., due to a duplexing mode of the neighboring UE, interference in the communication link between the UEs, beam sweeping, or the like). If the neighboring UE fails to receive and decode the control message, the neighboring UE may not receive the indication of the resource reservation, and may communicate using the reserved resources, which may cause interference, reduce throughput, and increasing overhead, among other issues.

SUMMARY

The described techniques relate to improved methods, systems, devices, and apparatuses, in accordance with various aspects of the present disclosure. Generally, the described techniques provide for a transmitting user equipment (UE) to transmit multiple sidelink control messages, such as a sidelink control information (SCI) message and one or more augmented SCI (ASCI) messages, to neighboring UEs indicating resources for sidelink data communications and an activity status of the resources. For example, the additional set of resources may be reserved for data communications, available for the data communications, recommended for the data communications, or a combination thereof. The one or more ASCI messages may indicate a repetition of the resources indicated in a primary SCI message (e.g., to provide resource reservation reassurance), one or more additional resources for sidelink data transmissions, or both. In some cases, the neighboring UEs may receive at least one of the SCI messages and determine which resources are reserved for data transmissions from the transmitting UE, which resources are available for sidelink communications, or both. In some examples, a neighboring UE may determine a portion of the resources are reserved for a sidelink data message with the transmitting UE and may transmit the sidelink data message or may receive the sidelink data message using the portion of the resources. Additionally or alternatively, a neighboring UE may determine a portion of the resources are reserved for a sidelink data message between the transmitting UE and another neighboring UE and may use alternative resources for any sidelink data messages or may wait to transmit a sidelink data message to avoid using the reserved resources.

A method for wireless communications at a first UE is described. The method may include determining a first set of resources of a shared radio frequency spectrum band for sidelink communications, the first set of resources including a first subset of resources for transmission of a sidelink data message between the first UE and a second UE and a second subset of resources for reception of the sidelink data message, transmitting, using a first subchannel of the shared radio frequency spectrum band, a first sidelink control message reserving the first set of resources for the sidelink data message, transmitting a second sidelink control message that indicates a second set of resources of the shared radio frequency spectrum band for data communications and an availability status of the second set of resources, and communicating the sidelink data message with the second UE, where communicating includes transmitting the sidelink data message using the first subset of resources or receiving the sidelink data message using the second subset of resources.

An apparatus for wireless communications at a first UE is described. The apparatus may include a processor, memory in electronic communication with the processor, and instructions stored in the memory. The instructions may be executable by the processor to cause the apparatus to determine a first set of resources of a shared radio frequency spectrum band for sidelink communications, the first set of resources including a first subset of resources for transmission of a sidelink data message between the first UE and a second UE and a second subset of resources for reception of the sidelink data message, transmit, using a first subchannel of the shared radio frequency spectrum band, a first sidelink control message reserving the first set of resources for the sidelink data message, transmit a second sidelink control message that indicates a second set of resources of the shared radio frequency spectrum band for data communications and an availability status of the second set of resources, and communicate the sidelink data message with the second UE, where communicating includes transmitting the sidelink data message using the first subset of resources or receiving the sidelink data message using the second subset of resources.

Another apparatus for wireless communications at a first UE is described. The apparatus may include means for determining a first set of resources of a shared radio frequency spectrum band for sidelink communications, the first set of resources including a first subset of resources for transmission of a sidelink data message between the first UE and a second UE and a second subset of resources for reception of the sidelink data message, means for transmitting, using a first subchannel of the shared radio frequency spectrum band, a first sidelink control message reserving the first set of resources for the sidelink data message, means for transmitting a second sidelink control message that indicates a second set of resources of the shared radio frequency spectrum band for data communications and an availability status of the second set of resources, and means for communicating the sidelink data message with the second UE, where communicating includes transmitting the sidelink data message using the first subset of resources or receiving the sidelink data message using the second subset of resources.

A non-transitory computer-readable medium storing code for wireless communications at a first UE is described. The code may include instructions executable by a processor to determine a first set of resources of a shared radio frequency spectrum band for sidelink communications, the first set of resources including a first subset of resources for transmission of a sidelink data message between the first UE and a second UE and a second subset of resources for reception of the sidelink data message, transmit, using a first subchannel of the shared radio frequency spectrum band, a first sidelink control message reserving the first set of resources for the sidelink data message, transmit a second sidelink control message that indicates a second set of resources of the shared radio frequency spectrum band for data communications and an availability status of the second set of resources, and communicate the sidelink data message with the second UE, where communicating includes transmitting the sidelink data message using the first subset of resources or receiving the sidelink data message using the second subset of resources.

Some examples of the method, apparatuses, and non-transitory computer-readable medium described herein may further include operations, features, means, or instructions for transmitting a set of multiple additional sidelink control messages, each indicating respective sets of resources for data communications and corresponding availability statuses.

Some examples of the method, apparatuses, and non-transitory computer-readable medium described herein may further include operations, features, means, or instructions for transmitting the second sidelink control message in a second subchannel of the shared radio frequency spectrum band, the second subchannel different from the first subchannel.

In some examples of the method, apparatuses, and non-transitory computer-readable medium described herein, the first subchannel may have a lowest subchannel index of a set of subchannels including the first subchannel and the second subchannel.

Some examples of the method, apparatuses, and non-transitory computer-readable medium described herein may further include operations, features, means, or instructions for transmitting the second sidelink control message in the first subchannel of the shared radio frequency spectrum band.

Some examples of the method, apparatuses, and non-transitory computer-readable medium described herein may further include operations, features, means, or instructions for transmitting a third sidelink control message that indicates the second set of resources of the shared radio frequency spectrum band, the second set of resources including an aggregate of resources reserved for data communications by one or more transmitting devices.

Some examples of the method, apparatuses, and non-transitory computer-readable medium described herein may further include operations, features, means, or instructions for transmitting an indication of the second sidelink control message in the first sidelink control message, where the indication may be based on a scrambling sequence of the first sidelink control message configured for the second sidelink control message.

Some examples of the method, apparatuses, and non-transitory computer-readable medium described herein may further include operations, features, means, or instructions for determining a resource configuration for the second sidelink control message, where the resource configuration indicates a configured number of subchannels for the second sidelink control message and transmitting the second sidelink control message in a set of subchannels according to the configured number of subchannels.

Some examples of the method, apparatuses, and non-transitory computer-readable medium described herein may further include operations, features, means, or instructions for transmitting, to the second UE, the resource configuration indicating the configured number of subchannels for the second sidelink control message.

Some examples of the method, apparatuses, and non-transitory computer-readable medium described herein may further include operations, features, means, or instructions for determining a set of resources available for data communications based on the first sidelink control message, the second sidelink control message, and one or more other control messages associated with data communications and transmitting one or more additional sidelink control channels indicating the set of resources available for data communications, where each of the one or more additional sidelink control channels may be transmitted in a respective subchannel of a set of subchannels including the first subchannel.

In some examples of the method, apparatuses, and non-transitory computer-readable medium described herein, determining the first set of resources may include operations, features, means, or instructions for monitoring for a control message from a wireless device, decoding the control message to identify resources indicated as reserved by the control message, and determining the first set of resources based on the resources indicated as reserved by the control message, the first set of resources nonoverlapping with the resources indicated as reserved by the control message.

In some examples of the method, apparatuses, and non-transitory computer-readable medium described herein, the first sidelink control message includes a first number of slots in the first subchannel and the second sidelink control message includes a second number of slots different from the first number of slots.

In some examples of the method, apparatuses, and non-transitory computer-readable medium described herein, the first sidelink control message includes a first number of slots in the first subchannel and the second sidelink control message includes a second number of slots that may be the same as the first number of slots.

In some examples of the method, apparatuses, and non-transitory computer-readable medium described herein, the availability status includes an indication that the second set of resources may be reserved for data communications, the second set of resources may be available for the data communications, or a sensing report indicating that the second set of resources may be for collision avoidance.

A method for wireless communications at a second UE is described. The method may include receiving, using a first subchannel of a shared radio frequency spectrum band, a first sidelink control message reserving a first set of resources for a sidelink data message between a first UE and the second UE, the first set of resources including a first subset of resources for transmission of the sidelink data message and a second subset of resources for reception of the sidelink data message, receiving a second sidelink control message that indicates a second set of resources of the shared radio frequency spectrum band for data communications and an availability status of the second set of resources, and communicating the sidelink data message with the first UE, where communicating includes transmitting the sidelink data message using the first subset of resources or receiving the sidelink data message using the second subset of resources.

An apparatus for wireless communications at a second UE is described. The apparatus may include a processor, memory in electronic communication with the processor, and instructions stored in the memory. The instructions may be executable by the processor to cause the apparatus to receive, using a first subchannel of a shared radio frequency spectrum band, a first sidelink control message reserving a first set of resources for a sidelink data message between a first UE and the second UE, the first set of resources including a first subset of resources for transmission of the sidelink data message and a second subset of resources for reception of the sidelink data message, receive a second sidelink control message that indicates a second set of resources of the shared radio frequency spectrum band for data communications and an availability status of the second set of resources, and communicate the sidelink data message with the first UE, where communicating includes transmitting the sidelink data message using the first subset of resources or receiving the sidelink data message using the second subset of resources.

Another apparatus for wireless communications at a second UE is described. The apparatus may include means for receiving, using a first subchannel of a shared radio frequency spectrum band, a first sidelink control message reserving a first set of resources for a sidelink data message between a first UE and the second UE, the first set of resources including a first subset of resources for transmission of the sidelink data message and a second subset of resources for reception of the sidelink data message, means for receiving a second sidelink control message that indicates a second set of resources of the shared radio frequency spectrum band for data communications and an availability status of the second set of resources, and means for communicating the sidelink data message with the first UE, where communicating includes transmitting the sidelink data message using the first subset of resources or receiving the sidelink data message using the second subset of resources.

A non-transitory computer-readable medium storing code for wireless communications at a second UE is described. The code may include instructions executable by a processor to receive, using a first subchannel of a shared radio frequency spectrum band, a first sidelink control message reserving a first set of resources for a sidelink data message between a first UE and the second UE, the first set of resources including a first subset of resources for transmission of the sidelink data message and a second subset of resources for reception of the sidelink data message, receive a second sidelink control message that indicates a second set of resources of the shared radio frequency spectrum band for data communications and an availability status of the second set of resources, and communicate the sidelink data message with the first UE, where communicating includes transmitting the sidelink data message using the first subset of resources or receiving the sidelink data message using the second subset of resources.

Some examples of the method, apparatuses, and non-transitory computer-readable medium described herein may further include operations, features, means, or instructions for receiving a set of multiple additional sidelink control messages, each indicating respective sets of resources for data communications and corresponding availability statuses.

Some examples of the method, apparatuses, and non-transitory computer-readable medium described herein may further include operations, features, means, or instructions for receiving the second sidelink control message in a second subchannel of the shared radio frequency spectrum band, the second subchannel different from the first subchannel.

In some examples of the method, apparatuses, and non-transitory computer-readable medium described herein, the first subchannel may have a lowest subchannel index of a set of subchannels including the first subchannel and the second subchannel.

Some examples of the method, apparatuses, and non-transitory computer-readable medium described herein may further include operations, features, means, or instructions for receiving the second sidelink control message in the first subchannel of the shared radio frequency spectrum band.

Some examples of the method, apparatuses, and non-transitory computer-readable medium described herein may further include operations, features, means, or instructions for receiving a third sidelink control message that indicates the second set of resources of the shared radio frequency spectrum band, the second set of resources including an aggregate of resources reserved for data communications by one or more transmitting devices.

Some examples of the method, apparatuses, and non-transitory computer-readable medium described herein may further include operations, features, means, or instructions for receiving an indication of the second sidelink control message in the first sidelink control message, where the indication may be based on a scrambling sequence of the first sidelink control message configured for the second sidelink control message.

Some examples of the method, apparatuses, and non-transitory computer-readable medium described herein may further include operations, features, means, or instructions for determining a resource configuration for the second sidelink control message, where the resource configuration indicates a configured number of subchannels for the second sidelink control message and monitoring for the second sidelink control message in a set of subchannels according to the configured number of subchannels.

Some examples of the method, apparatuses, and non-transitory computer-readable medium described herein may further include operations, features, means, or instructions for receiving one or more additional sidelink control channels indicating a set of resources available for data communications, where each of the one or more additional sidelink control channels may be received in a respective subchannel of a set of subchannels including the first subchannel and determining resources for a subsequent data communication by the second UE based on the set of resources available for data communications.

In some examples of the method, apparatuses, and non-transitory computer-readable medium described herein, the first sidelink control message includes a first number of slots in the first subchannel and the second sidelink control message includes a second number of slots different from the first number of slots.

In some examples of the method, apparatuses, and non-transitory computer-readable medium described herein, the first sidelink control message includes a first number of slots in the first subchannel and the second sidelink control message includes a second number of slots that may be the same as the first number of slots.

In some examples of the method, apparatuses, and non-transitory computer-readable medium described herein, the availability status includes an indication that the second set of resources may be reserved for the data communications, the second set of resources may be recommended for the data communications, or a sensing report associated with the second set of resources.

A method for wireless communications at a second UE is described. The method may include receiving, using a first subchannel of a shared radio frequency spectrum band, a first sidelink control message reserving a first set of resources for a first sidelink data message between a first UE and a third UE, receiving a second sidelink control message that indicates a second set of resources of the shared radio frequency spectrum band for data communications and an availability status of the second set of resources, selecting a third set of resources for a second sidelink data message between the second UE and a fourth UE based on the first sidelink control message and the second sidelink control message, the third set of resources including a first subset of resources for transmission of the second sidelink data message and a second subset of resources for reception of the second sidelink data message, and communicating the second sidelink data message with the fourth UE, where communicating includes transmitting the second sidelink data message using the first subset of resources or receiving the second sidelink data message using the second subset of resources.

An apparatus for wireless communications at a second UE is described. The apparatus may include a processor, memory in electronic communication with the processor, and instructions stored in the memory. The instructions may be executable by the processor to cause the apparatus to receive, using a first subchannel of a shared radio frequency spectrum band, a first sidelink control message reserving a first set of resources for a first sidelink data message between a first UE and a third UE, receive a second sidelink control message that indicates a second set of resources of the shared radio frequency spectrum band for data communications and an availability status of the second set of resources, select a third set of resources for a second sidelink data message between the second UE and a fourth UE based on the first sidelink control message and the second sidelink control message, the third set of resources including a first subset of resources for transmission of the second sidelink data message and a second subset of resources for reception of the second sidelink data message, and communicate the second sidelink data message with the fourth UE, where communicating includes transmitting the second sidelink data message using the first subset of resources or receiving the second sidelink data message using the second subset of resources.

Another apparatus for wireless communications at a second UE is described. The apparatus may include means for receiving, using a first subchannel of a shared radio frequency spectrum band, a first sidelink control message reserving a first set of resources for a first sidelink data message between a first UE and a third UE, means for receiving a second sidelink control message that indicates a second set of resources of the shared radio frequency spectrum band for data communications and an availability status of the second set of resources, means for selecting a third set of resources for a second sidelink data message between the second UE and a fourth UE based on the first sidelink control message and the second sidelink control message, the third set of resources including a first subset of resources for transmission of the second sidelink data message and a second subset of resources for reception of the second sidelink data message, and means for communicating the second sidelink data message with the fourth UE, where communicating includes transmitting the second sidelink data message using the first subset of resources or receiving the second sidelink data message using the second subset of resources.

A non-transitory computer-readable medium storing code for wireless communications at a second UE is described. The code may include instructions executable by a processor to receive, using a first subchannel of a shared radio frequency spectrum band, a first sidelink control message reserving a first set of resources for a first sidelink data message between a first UE and a third UE, receive a second sidelink control message that indicates a second set of resources of the shared radio frequency spectrum band for data communications and an availability status of the second set of resources, select a third set of resources for a second sidelink data message between the second UE and a fourth UE based on the first sidelink control message and the second sidelink control message, the third set of resources including a first subset of resources for transmission of the second sidelink data message and a second subset of resources for reception of the second sidelink data message, and communicate the second sidelink data message with the fourth UE, where communicating includes transmitting the second sidelink data message using the first subset of resources or receiving the second sidelink data message using the second subset of resources.

Some examples of the method, apparatuses, and non-transitory computer-readable medium described herein may further include operations, features, means, or instructions for refraining from communicating the second sidelink data message using the first set of resources and the second set of resources based on the availability status indicating that the second set of resources may be reserved for data communications or associated with collision avoidance.

In some examples of the method, apparatuses, and non-transitory computer-readable medium described herein, the first sidelink control message includes an indication of the second sidelink control message.

BRIEF DESCRIPTION OF THE DRAWINGS

FIGS. 3 and 4A through 4C illustrate examples of resource diagrams in accordance with aspects of the present disclosure.

DETAILED DESCRIPTION

Figure 1:
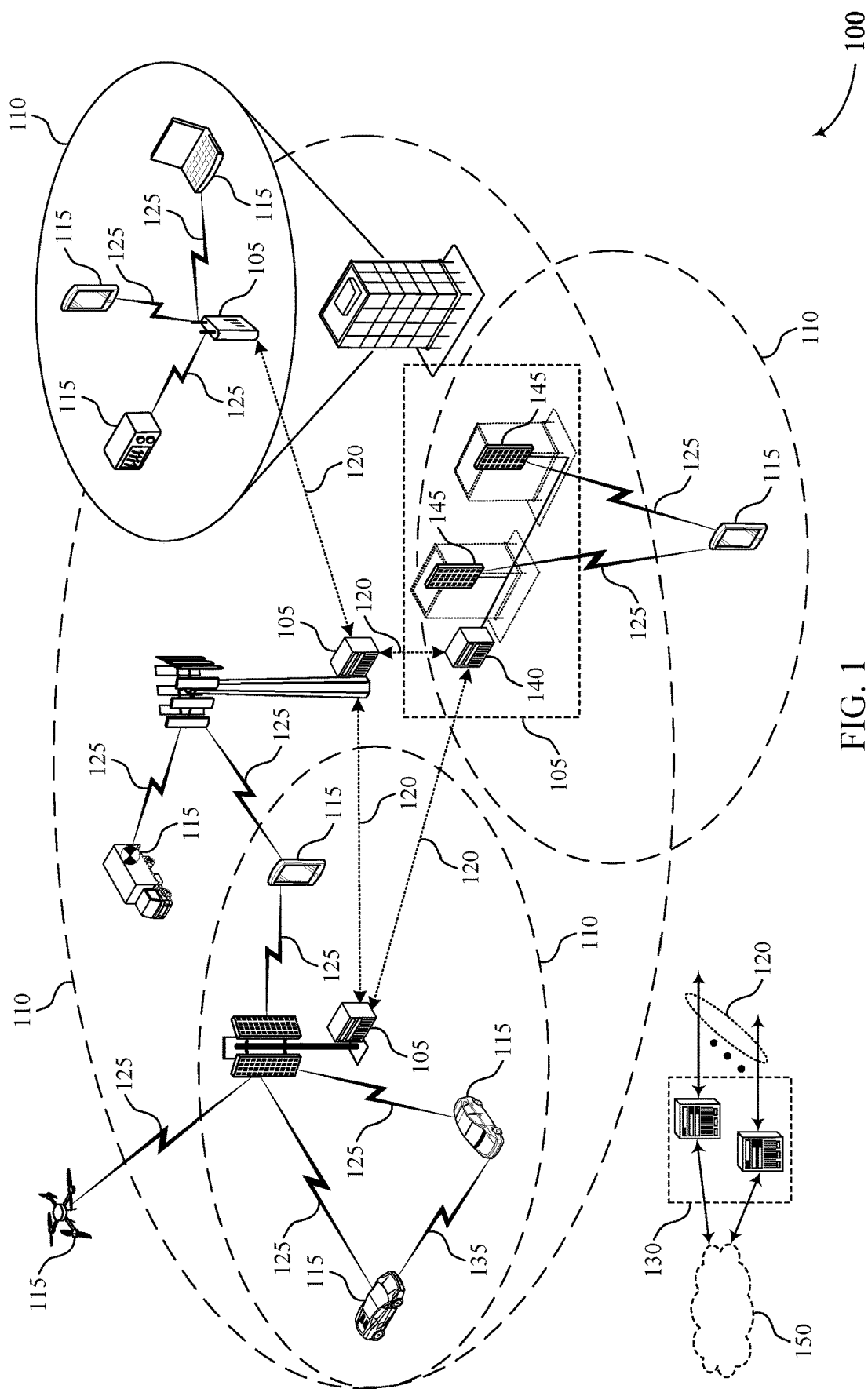
FIGS. 1 and 2 illustrate examples of wireless communications systems in accordance with aspects of the present disclosure.

In some wireless communications systems, such as a New Radio in unlicensed spectrum (NR-U) system, an Internet of Things (IoT) system, or both, a user equipment (UE) may communicate with one or more neighboring UEs. In some cases, for the NR-U system, the UE may be operating as an anchor UE and may broadcast sidelink control information (SCI) to neighboring client UEs. In some other cases, for the IoT system, the UE may be a programmable logic controller (PLC) and may broadcast the SCI to one or more neighboring sensor/actuator (S/A) devices. The anchor UE or PLC may have increased capability (e.g., higher processing power) when compared with the neighboring devices. The SCI, which may be a first stage SCI (SCI1), may indicate resources that are reserved for one or more transmissions between UEs (e.g., the anchor UE and one or more client UEs). A client UE or S/A UE may receive the broadcasted SCI1 message from the anchor UE or PLC, respectively, and may identify the reserved resources for the one or more data transmissions. Second stage SCI (SCI2) may also be transmitted, which may indicate resources reserved for retransmissions or feedback information. However, in some cases, the client UE or S/A UE may have a half duplexing mode activated, may experience interference in the communication link for the broadcast message, may be performing a beam sweeping operation, or the like, and may not receive or successfully decode the SCI1 message from the anchor UE or PLC. Therefore, the client UE or S/A UE may be unaware of which resources may be reserved for the one or more data transmissions and may transmit control signaling or data using resources reserved for a different transmission, which may increase signaling overhead and latency in the wireless communications system (e.g., due to increased interference and subsequent retransmissions).

As described herein, a UE may transmit an additional sidelink control message (e.g., an augmented SCI (ASCI)) that includes an indication of resources reserved for data transmissions between a UEs or other transmitting devices. The ASCI may be in addition to SCI1 and SCI2. For example, an anchor UE or a PLC may transmit a message, such as a broadcast message, including one or more SCI messages using one or more subchannels to neighboring UEs (e.g., client UEs or S/A UEs). The one or more SCI messages may include an SCI1 message and may include an indication of resources that are reserved for data transmissions between the anchor UE or the PLC and one or more of the neighboring UEs. In some cases, the anchor UE or the PLC may transmit one or more ASCIs (ASCI1, ASCI2, etc.) to ensure the neighboring UEs receive the information included in the broadcast message. For example, the anchor UE or the PLC may transmit an additional message including the indication of the resources. In some cases, the additional message may be transmitted in a different subchannel than the initial broadcast message and may include a different number of slots or symbols. In some other cases, the additional broadcast message may be transmitted in the same subchannel as the initial broadcast message and may include a configured number of slots or symbols. The neighboring UEs may receive either the broadcast message including the SCI, the broadcast message including the ASCI, or both, and may receive the data transmissions from the anchor UE or PLC using the resources indicated by the SCI, ASCI, or both.

Aspects of the disclosure are initially described in the context of wireless communications systems. Aspects of the disclosure are further described in the context of resource diagrams and process flows. Aspects of the disclosure are further illustrated by and described with reference to apparatus diagrams, system diagrams, and flowcharts that relate to SCI signaling for wireless communications.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC)

device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a transmitting UE 115, which may be an example of an anchor UE in an NR-U system, a PLC in an IoT system, or the like, may beamform transmissions to one or more neighboring UEs 115. In some examples, the transmitting UE 115 may transmit an SCI message with a first format (e.g., an SCI1 message) including an indication of one or more resources for data communication and an availability status of the resources. The availability status may indicate one or more reserved resources for data reception, one or more recommended resources for data reception, a sensing report indicating resources for collision avoidance, or a combination thereof. For example, an anchor UE 115 may schedule transmissions to one or more client UEs 115 on sets of reserved resources. That is, the anchor UE 115 may broadcast an SCI message (e.g., an SCI1 message) to neighboring UEs 115. The UEs 115 that receive the SCI1 message may identify the reserved resources and refrain from transmitting on the reserved resources to avoid resource collisions. However, a UE 115 may fail to receive or decode the SCI1 message from the transmitting UE 115. Thus, the transmitting UE 115 and the UE 115 may be unable to coordinate resource selection, and the UE 115 may be unaware of the resource reservation by the transmitting UE 115. The UE 115 may schedule transmissions using the reserved resources, which may result in interference for communications between the transmitting UE 115 and neighboring UEs 115.

In some examples, a transmitting UE 115 may transmit one or more additional SCI messages (ASCI) to neighboring UEs 115 indicating the resources reserved for one or more sidelink data transmissions. For example, the transmitting UE 115 may determine multiple subchannels are available in a shared channel and may transmit multiple SCI1 messages using each subchannel. The multiple SCI1 messages may include one or more ASCI messages. The ASCI may indicate a repetition of the resources indicated in the SCI1 message, one or more additional resources for sidelink data transmissions, or both. In some cases, the neighboring UEs 115 may receive at least one of the SCI messages. The neighboring UEs 115 may determine one or more resources are reserved for data transmissions from the transmitting UE 115. In some examples, a neighboring UE 115 may determine a portion of the resources are reserved for a sidelink data message with the transmitting UE 115 and may transmit the sidelink data message or may receive the sidelink data message using a portion of the resources. Additionally or alternatively, a neighboring UE 115 may determine a portion of the resources are reserved for a sidelink data message between the transmitting UE 115 and another neighboring UE 115 and may use alternative resources for any sidelink data messages or may wait to transmit a sidelink data message to avoid using the reserved resources.

Figure 2:
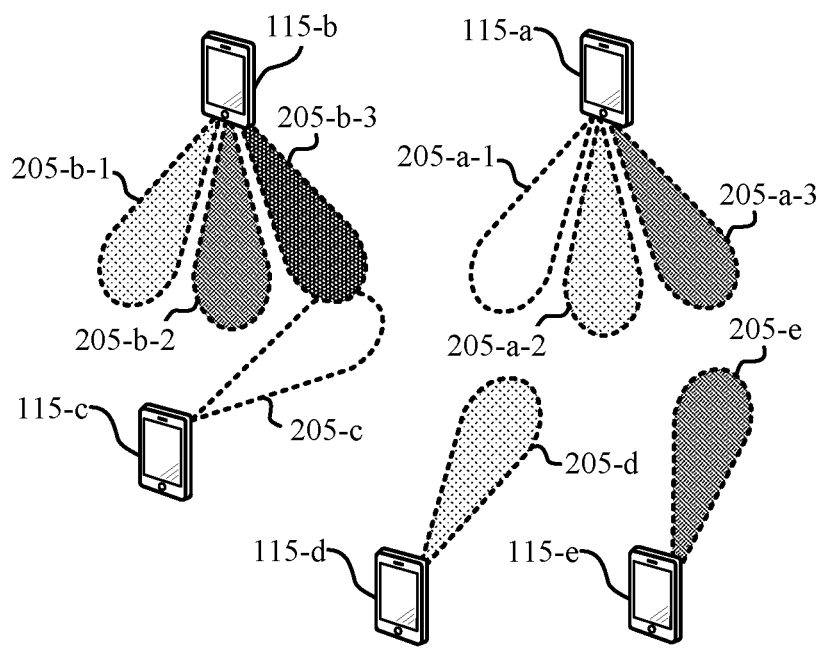

FIG. 2 illustrates an example of a wireless communications system 200 in accordance with aspects of the present disclosure. In some examples, wireless communications system 200 may implement aspects of wireless communication system 100 and may include UE 115-*a* through UE 115-*e*, which may be examples of UEs 115 as described with reference to FIG. 1. In some examples, the UEs 115 may communicate with a base station 105 via an uplink or downlink communication link, or may communicate with other UEs 115 using a sidelink communication link. For example, UE 115-*a* and UE 115-*b* may transmit control information or data to UE 115-*c* through UE 115-*e* using one or more resources, may receive control information or data from UE 115-*c* through UE 115-*e* using one or more resources, or both. In some examples, UE 115-*a*, UE 115-*b*, or both may transmit control information, such as one or more SCI messages and ASCI messages, to UE 115-*c* through UE 115-*e* including an indication of the resources reserved for a sidelink data message.

In some examples, UE 115-*a* and UE 115-*b* may beamform transmissions to UE 115-*c*, UE 115-*d*, UE 115-*e*, or a combination using one or more groups of beams 205-*a* (e.g., beams 205-*a*-1, 205-*a*-2, and 205-*a*-3) and beams 205-*b* (e.g., beams 205-*b*-1, 205-*b*-2, and 205-*b*-3), respectively. UE 115-*a* and UE 115-*b* may direct the groups of beams 205-*a* and beams 205-*b* in multiple directions to communicate with multiple UEs 115. In some cases, UEs 115-*c*, UE 115-*d*, and UE 115-*e* may monitor for data or control signaling on beam 205-*c*, beam 205-*d*, and beam 205-*e*, respectively. In some systems (e.g., systems using a sub-6 GHz frequency band), the UEs 115 may communicate via communication links, such as communication links 125 as described with respect to FIG. 1 rather than using the beams 205. In some examples, UEs 115-*a* and 115-*b* may be referred to as transmitting UEs 115 or anchor UEs 115 (e.g., PLCs in an IoT or an industrial IoT (IIoT) system). UE 115-*c*, UE 115-*d*, and UE 115-*e* may be referred to as receiving UEs 115 or client UEs 115 (e.g., S/As in an IoT system).

In some examples, each client UE 115 (e.g., each of UEs 115-*c*, 115-*d*, and 115-*e*) may be in communication with one anchor UE 115, while each anchor UE 115 may serve multiple client UEs 115 (e.g., in an IoT system, a PLC may be in communication with 20 S/As, 50 S/As, or some other number of S/As). For example, client UE 115-*e* may communicate with anchor UE 115-*a*, such as by monitoring beam 205-e for communications from anchor UE 115-a, and anchor UE 115-a may serve client UE 115-c, UE 115-d, UE 115-e, or a combination thereof. In some examples, the anchor UEs 115 may be configured with a relatively higher capability (e.g., greater bandwidth, improved beamforming capabilities, increased processing power, or the like) when compared with the client UEs 115.

In some examples, the UEs 115 may be implemented in a V2X system, such as a cellular V2X (C-V2X) system. In the V2X system, the UEs 115 may perform sidelink data reception by performing blind decoding in sidelink subchannels (e.g., to receive a sidelink packet). For example, if the number of sidelink subchannels is relatively small (e.g., 1 to 27 subchannels), the UEs 115 may perform the blind decoding. Each subchannel may vary in size or may have a fixed number of RBs (e.g., at least 10 RBs). In some examples, a sidelink control channel (e.g., a physical sidelink control channel (PSCCH)) and a sidelink shared channel (e.g., a physical sidelink shared channel (PSSCH)) may be transmitted within a same slot. The sidelink shared channel may occupy up to a number of contiguous subchannels, which may be defined as $N_{subchannels}^{SL}$, while the sidelink control channel may occupy up to one subchannel based on the subchannel index (e.g., with a lowest subchannel index).

In some cases, there may be multiple methods to perform resource allocation in the V2X system. For example, in a first mode (e.g., Mode 1), a base station 105 may assign transmission resources for sidelink communication via control signaling, such as a downlink control information (DCI) message. The transmitting UE 115 may support dynamic grants, configured grants (e.g., a Type 1 configured grant, a Type 2 configured grant, or both), or both. The Type 1 configured grant may be activated via control signaling, such as RRC signaling, from the base station 105. The base station may transmit the DCI message to allocate time and frequency resources for the sidelink communication and indicate a transmission timing. Additionally or alternatively, the base station may set up a modulation and coding scheme (MCS) at the transmitting UE 115. In some other examples, in a second mode (e.g., Mode 2), a transmitting UE 115 may autonomously decide which resources to use for sidelink communication. The transmitting UE 115 may perform channel sensing by performing a blind decoding procedure in which the UE 115 decodes sidelink control channels and finds out which resources are reserved for other sidelink transmissions. The transmitting UE 115 may report the available resources to an upper layer (e.g., a base station 105), and the upper layer may decide resource usage. The behavior of the receiving UE 115 may be the same for both modes.

In some other examples, the UEs 115 may be implemented in an IoT system, such as an IIoT system. In the IoT system, the UEs 115, which may be examples of PLCs and S/As, may perform sidelink data communications. A PLC may have a tight latency parameter, such as 1 ms or 2 ms, and error rate (e.g., an ultra-reliability requirement of $10^{-6}$), so communications with a base station 105 may use multiple over the air (OTA) transmissions, which may affect latency and reliability in the IoT system. The packet size for IoT communication traffic may be relatively small (e.g., 32-256 Bytes), so a PLC may use a low bandwidth for communicating with the S/As (e.g., 2 resource blocks). In some examples, S/As may have a lower UE capability for bandwidth and processing power and may detect or monitor a portion of transmissions. However, overall bandwidth may be relatively large for an IoT system with dedicated frequency bands, unlicensed communication bands, or both (e.g., a PSCCH may meet an IoT specification with challenging radio frequency environments due to blockage and interference). Thus, the PLCs may communicate directly with the S/As via sidelink communication.

In some examples, an anchor UE 115, such as UE 115-a, UE 115-b, or both, may transmit an SCI message with a first format (e.g., an SCI1 message) including one or more parameters. The one or more parameters may include a priority indication (e.g., a 3 bit value), a frequency resource assignment (e.g., a bit value depending on the number of slot reservations and the number of subchannels), a time resource assignment (e.g., a 5 bit value or a 9 bit value for 2 or 3 reservations, respectively), a resource reservation period (e.g., a bit value depending on the number of allowed periods), a demodulation reference signal (DMRS) pattern (e.g., a bit value depending on the number of configured patterns), an indication of an SCI2 format (e.g., a 2 bit value), a beta offset for SCI2 rate matching (e.g., a 2 bit value), an indication of a DMRS port (e.g., a 1 bit value indicating one or two data layers), an MCS (e.g., a 5 bit value), an additional MCS table (e.g., a 0-2 bit value), a physical sidelink feedback channel (PSFCH) overhead indicator (e.g., a 0 or 1 bit value), one or more reserved bits (e.g., a bit value based on upper layer), or a combination thereof. In some cases, the SCI1 message may include information about a sidelink shared channel bandwidth (e.g., a PSSCH bandwidth) and resource reservations in future slots. The SCI1 message may be decoded by intended receivers and other sidelink UEs 115 (e.g., operating in Mode 2), to allow channel sensing and avoid resource collision.

For example, UE 115-a may schedule transmissions to one or more client UEs 115 on sets of reserved resources. That is, UE 115-a may broadcast an SCI message, such as an SCI message with a first format, which may also be referred to as a first stage SCI (e.g., an SCI1 message), to UE 115-b, UE 115-c, UE 115-d, UE 115-e, and any additional neighboring UEs 115. The SCI1 message may indicate a resource allocation for resources that are reserved for transmissions by UE 115-a. For example, the SCI1 message may indicate resources that are reserved for transmissions from UE 115-a to UE 115-c. The UEs 115 that receive the SCI1 message may identify the reserved resources and refrain from transmitting on the reserved resources to avoid resource collisions. UE 115-a may transmit the SCI1 message in a sidelink control channel (e.g., a PSCCH).

However, a UE 115 may fail to receive or decode the SCI1 message from UE 115-a (e.g., while operating in a frequency range, such as a first frequency range (FR1), operating according to mmW communication, or both) due to a communication mode at the UE 115, beam sweeping techniques for transmitting the SCI1 message, a blocked communication link between UE 115-a and the UE 115, or a combination thereof. For example, UE 115-b may fail to receive the SCI1 message from UE 115-a if UE 115-b is in half-duplex mode and UE 115-b is transmitting data when UE 115-a transmits the SCI1 message, if UE 115-a switches to a beam 205 that lacks the resource reservation indication (e.g., to beam 205-a-1), if there is a weak anchor-to-anchor communication link, or a combination thereof. Thus, anchor UE 115-a and UE 115-b may be unable to coordinate resource selection, and UE 115-b may be unaware of the resource reservation by UE 115-a. UE 115-b may schedule transmissions using the reserved resources, which may result in interference at UE 115-c.

In some examples, UE 115-a may transmit one or more additional SCI messages to neighboring UEs 115 (e.g., to UE 115-b, UE 115-c, UE 115-d, UE 115-e, or a combination thereof in a broadcast message) indicating the resources reserved for one or more sidelink data transmissions. For example, UE 115-a may determine multiple subchannels are available in a shared channel, such as a physical sidelink shared channel (PSSCH). UE 115-a may transmit multiple SCI1 messages using each subchannel (e.g., with a primary SCI1 message in a subchannel with the lowest index), which is described in further detail with respect to FIGS. 3 and 4A. The multiple SCI1 messages may include one or more ASCI messages. The ASCI message may indicate a repetition of the resources indicated in the SCI1 message, one or more additional resources for sidelink data transmissions, or both. In some other examples, UE 115-a may transmit multiple SCI1 messages using a same subchannel, which is described in further detail with respect to FIGS. 4B and 4C.

In some cases, the neighboring UEs 115 may receive at least one of the SCI messages. The neighboring UEs 115 may determine one or more resources are reserved for data transmissions from UE 115-a. For example, UE 115-b through UE 115-e may receive at least one SCI message from UE 115-a that reserves resources for data transmissions. In some examples, UE 115-c may determine a portion of the resources are reserved for a sidelink data message between UE 115-c and UE 115-a and may transmit the sidelink data message or may receive the sidelink data message using the portion of the resources. Additionally or alternatively, UE 115-c may determine a portion of the resources are reserved for a sidelink data message between UE 115-a and other neighboring UEs 115 (e.g., other than UE 115-c) and may use alternative resources for any sidelink data messages or may wait to transmit a sidelink data message to avoid using the reserved resources.

In some examples, an anchor UE 115, such as UE 115-a, UE 115-b, or both, may transmit an SCI message with a second format (e.g., SCI2) in addition to the multiple SCI1 messages, ASCI messages, or both. For example, UE 115-a may transmit an SCI2 message and the receiving UE 115 may decode the SCI2 message after decoding a sidelink control channel (e.g., a PSCCH). The receiving UE 115 may use a source identifier and a destination identifier to determine whether a packet is for the receiving UE 115 and which UE 115 the packet is coming from. The SCI2 message may include one or more parameters, such as a HARQ feedback identifier (e.g., with a bit value based on a number of HARQ processes), new data indicator (NDI) (e.g., a 1 bit value), RV-ID (e.g., a 2 bit value), a source identifier (e.g., an 8 bit value), destination identifier (e.g., a 16 bit value), HARQ enable/disable (e.g., a 1 bit value), one or more SCI2-A fields (e.g., cast type and a channel state information (CSI) request, which may be a 2 bit value and 1 bit value, respectively), one or more SCI2-B fields (e.g., for a negative acknowledgement (NACK) groupcast, such as a zone identifier and a communication range, which may be a 12 bit value and a 4 bit value, respectively), or a combination thereof. The SCI2 may be used by receivers to decode a shared channel, such as a PSSCH.

Figure 3:
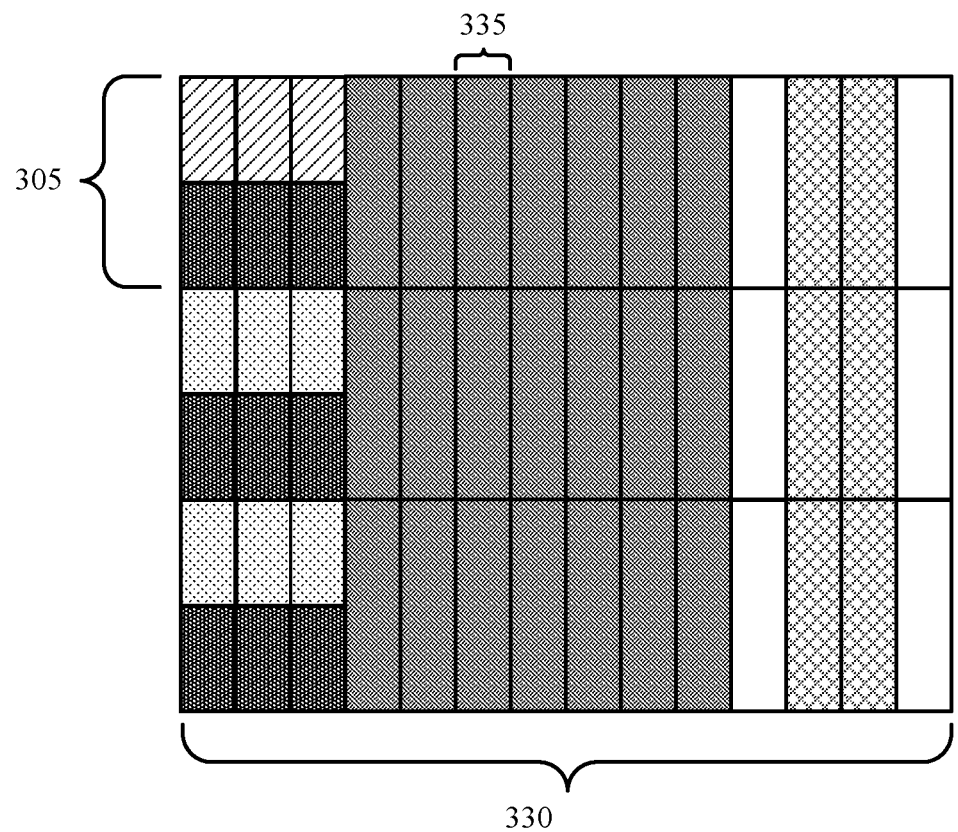
Figure 3:
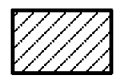
Figure 3:
Figure 3:
Figure 3:
Figure 3:
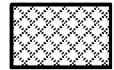
Figure 3:

FIG. 3 illustrates an example of a resource diagram 300 in accordance with aspects of the present disclosure. In some examples, resource diagram 300 may implement aspects of wireless communications systems 100 or 200. For example, resource diagram 300 may be implemented by multiple UEs 115 as described with reference to FIGS. 1 and 2. In some cases, a transmitting UE 115 may communicate a sidelink message (e.g., including control signaling or data) to a receiving UE 115 using one or more subchannels 305 of a beam, a communication link, or both. For example, transmitting UE 115 may communicate multiple SCI messages (e.g., including one or more SCI1 messages 310, SCI2 messages 315, ASCI messages 320, or a combination thereof) to reserve one or more time frequency resources of a sidelink shared channel 325 for communications with one or more receiving UEs 115.

In some examples, a transmitting UE 115, such as an anchor UE 115 or a PLC, may use one or more subchannels 305 to communicate with neighboring UEs 115 across a number of slots 330 in the time domain, and each slot 330 may include a number of symbols 335 (e.g., 14 OFDM symbols within a slot 330, or some other number of symbols 335). For example, there may be between 1 and 27 subchannels 305 in a resource pool. Each subchannel 305 may include a number of physical resource blocks (PRBs) in the frequency domain (e.g., one subchannel 305 may include 10, 50, 100, or some other number of PRBs). In some cases, the subchannels 305 may include one or more symbols 335 dedicated for communications using the sidelink shared channel 325 (e.g., 2 symbols 335, 3 symbols 335, or any other number of symbols 335), which may be configured to occupy a number of PRBs (e.g., 10, 12, 14, 20, 25, or any other number of PRBs). The size of the sidelink shared channel 325 may be configured (e.g., fixed) for a resource pool, such as 10% to 100% of one subchannel 305 depending on the configuration. The sidelink shared channel 325 may occupy at least one subchannel 305 and may include SCI, such as SCI2.

One or more of the symbols 335 and the PRBs of the subchannel 305 may be configured for each of the SCI1 messages 310, the SCI2 messages 315, the ASCI messages 320, or the sidelink feedback channel 340 (e.g., a PSFCH). Additionally or alternatively, the subchannel 305 may include one or more gaps 345 configured before and after the sidelink feedback channel 340 within the subchannel 305. The transmitting UE 115 may transmit an SCI message, such as SCI1 message 310, an ASCI message 320, or both in SCI resources occupying a number of symbols 335 of the slot 330 and some number of PRBs of a subchannel 305. In some cases, a primary SCI1 message 310 (e.g., transmitted in a PSCCH) may occupy up to one subchannel 305 (e.g., a subchannel 305 with the lowest subchannel index). The SCI1 message 310 may include a frequency domain resource allocation (FDRA), which may include $$\left\lceil \log \frac{N_{subchannel}^{SL}(N_{subchannel}^{SL}+1)}{2} \right\rceil$$

bits for 2 resource reservations or $$\left\lceil \log \frac{N_{subchannel}^{SL}(N_{subchannel}^{SL}+1)(2N_{subchannel}^{SL}+1)}{6} \right\rceil$$

bits for 3 resource reservations, and a time domain resource allocation (TDRA), which may include 5 bits for 2 resource reservations or 9 bits for 3 resource reservations. An SCI2 message 315 may be transmitted in SCI resources, or in PSSCH resources, which may occupy a number of symbols 335 in the slot 330 and a number of subchannels 305 (e.g., 1 subchannel 305, 2 subchannels 305, or some other number of contiguous subchannels 305). The SCI2 message 315 may reserve one or more resources for a feedback message (e.g., in the sidelink feedback channel 340)

In some examples, the transmitting UE 115 may transmit multiple SCI1 messages 310, ASCI messages 320, or both if multiple subchannels 305 are available in the sidelink shared channel 325. For example, the UE 115 may transmit a primary SCI1 message 310 in a subchannel 305 with the lowest index. The primary SCI1 message 310 may reserves resources for a concurrent transmission or retransmission of a sidelink data message. In some examples, the primary SCI1 message 310 may indicate one or more ASCI messages 320 or may not indicate one or more ASCI messages 320. For example, if the primary SCI1 message 310 does indicate the one or more ASCI messages 320, the primary SCI1 message 310 may use a CRC-scrambling sequence indicating the ASCI messages 320. If the primary SCI1 message 310 does not indicate the one or more ASCI messages 320, neighboring UEs 115 may perform blind decoding in one or more subchannels 305 even if they decode a primary SCI1 message 310.

In some cases, one or more ASCI messages 320 may be transmitted in one or more subchannels 305 different than the subchannel 305 including the primary SCI1 message 310, which is described in further detail with respect to FIG. 4A. Each ASCI message 320 may indicate an availability status of one or more resources for data reception. For example, the ASCI messages 320 may indicate one or more reserved resources for data reception (e.g., the first ASCI message 320), one or more recommended resources for data reception (e.g., one or more additional ASCI messages 320), a sensing report indicating resources for collision avoidance, or a combination thereof. The ASCI messages 320 may include the information from the primary SCI1 message 310 (e.g., may be a repeated SCI1 message 310, which was transmitted by the intended transmitting UE 115). Additionally or alternatively, the ASCI messages 320 may indicate an aggregate of the resources reserved by the transmitting UE 115 or other wireless devices. In some examples, the number of ASCI messages may be configured (e.g., preconfigured or fixed to a number, such as the number of subchannels 305 in the sidelink shared channel 325, a number equal to an aggregation level of the SCI1 message 310, or the like) for a set of slots 330 to reduce blind decoding complexity. In some cases, the one or more ASCI messages 320 may be transmitted in the same subchannel 305 as the subchannel 305 including the primary SCI1 message 310, which is described in further detail with respect to FIGS. 4B and 4C.

FIGS. 4A through 4C illustrate example resource diagrams 400 in accordance with aspects of the present disclosure. In some examples, resource diagrams 400 may implement aspects of wireless communications systems 100 or 200. For example, resource diagrams 400 may be implemented by multiple UEs 115 as described with reference to FIGS. 1, 2, and 3. In some cases, such as in resource diagram 400-a through resource diagram 400-c, a transmitting UE 115 may communicate a sidelink message (e.g., including control signaling or data) to a receiving UE 115 using one or more subchannels 405 via a beam, a communication link, or both. For example, such as in FIG. 4A, the transmitting UE 115 may communicate one or more SCI1 messages 410, SCI2 messages 415, ASCI messages 420, or a combination thereof using multiple subchannels 405 (e.g., subchannel 405-a and subchannel 405-b) to reserve one or more time frequency resources of a sidelink shared channel 425 for communications with one or more receiving UEs 115. In some other examples, such as in FIGS. 4B and 4C, the transmitting UE 115 may communicate one or more SCI1 messages 410 and ASCI messages 420 using a single subchannel 405 (e.g., subchannel 405-c) and an SCI2 message 415 using multiple subchannels 405 (e.g., subchannel 405-c and subchannel 405-d in FIG. 4B) or a single subchannel 405 (e.g., subchannel 405-e in FIG. 4C) to reserve one or more time frequency resources of a sidelink shared channel 425 for communications with one or more receiving UEs 115.

In some examples, a transmitting UE 115, such as an anchor UE 115 or a PLC, may use one or more subchannels 405 to communicate with neighboring UEs 115 across a number of slots 430 in the time domain, and each slot 430 may include some number of symbols 435 and some number of PRBs, as described with reference to FIG. 3. One or more of the symbols 435 and the PRBs of a subchannel 405 may be configured for each of the SCI1 messages 410, the SCI2 messages 415, the ASCI messages 420, or the sidelink feedback channel 440. Additionally or alternatively, the subchannel 405 may include one or more gaps 445 configured before and after the sidelink feedback channel 440 within the subchannel 405. The transmitting UE 115 may transmit multiple SCI messages, such as SCI1 message 410, an SCI2 message, an ASCI message 420, or a combination thereof based on the number of subchannels 405 with available SCI resources.

For example, such as in FIG. 4A, the transmitting UE 115 may transmit a primary SCI1 message 410 and one or more ASCI messages 420 in multiple subchannels 405-a and 405-b. In some cases, the subchannel 405 including the primary SCI1 message 410, such as subchannel 405-a, may be different than the subchannel 405 including the one or more ASCI messages 420, such as subchannel 405-b. Additionally or alternatively, the subchannel 405 including the primary SCI1 message 410, such as subchannel 405-a, may also include the one or more ASCI messages 420, such that the ASCI messages may be included in subchannel 405-a, subchannel 405-b, or both. In some examples, if the UE 115 transmits multiple ASCI messages 420, they may be repetitions of the first, or previous, ASCI messages 420, may include an indication of the resources reserved in the primary SCI1 message 410, may include an indication of additional resources recommended or reserved for data communications, may include a sensing report indicating resources for collision avoidance, or a combination thereof. The SCI2 message 415 may be included in subchannel 405-a, subchannel 405-b, or both. For example, a UE may perform a channel sensing procedure by monitoring a set of resources, and may determine that a given set of resources is being utilized by one or more other devices. The UE may indicate the given set of resources in the sensing report, which may be used for collision avoidance.

In some other examples, such as in FIG. 4B, the one or more ASCI messages 420 may be transmitted in the same subchannel 405 that includes the primary SCI1 message 410 (e.g., subchannel 405-c). In some cases, subchannel 405-c may be different than the subchannel 405 including one or more SCI2 messages 415, such as subchannel 405-d. Additionally or alternatively, subchannel 405-c may also include one or more SCI2 messages 415. If the UE 115 transmits the ASCI messages 420 and the SCI1 message 410 in the same subchannel 405 (e.g., subchannel 405-c), an ASCI pattern may be the same as an aggregation level pattern for the SCI1 message 410. The number of ASCI messages 420 may be configured (e.g., fixed to a preconfigured or indicated number, such as the number of subchannels 405 in the sidelink shared channel 425, equal to an aggregation level of supported SCI1 messages 410, or the like) at the transmitting UE 115. In some cases, the first ASCI message 420 may be configured (e.g., via control signaling or fixed to a preconfigured value) for a set of slots 430, which may reduce blind decoding complexity. Thus, other neighboring UEs 115 decoding the ASCI message 420 may avoid occupying the resources reserved in the SCI1 message 410, the ASCI message 420, or both.

In some cases, such as in FIG. 4C, the one or more ASCI messages 420 may be transmitted in the same subchannel 405 as the primary SCI1 message 410 and the SCI2 message 415 (e.g., subchannel 405-*e*). The one or more ASCI messages 420 may include a different number of symbols 435 than the SCI1 message 410, the SCI2 message 415, or both. The SCI2 message 415 may reserve one or more resources for a feedback message (e.g., in the sidelink feedback channel 440).

Figure 5:
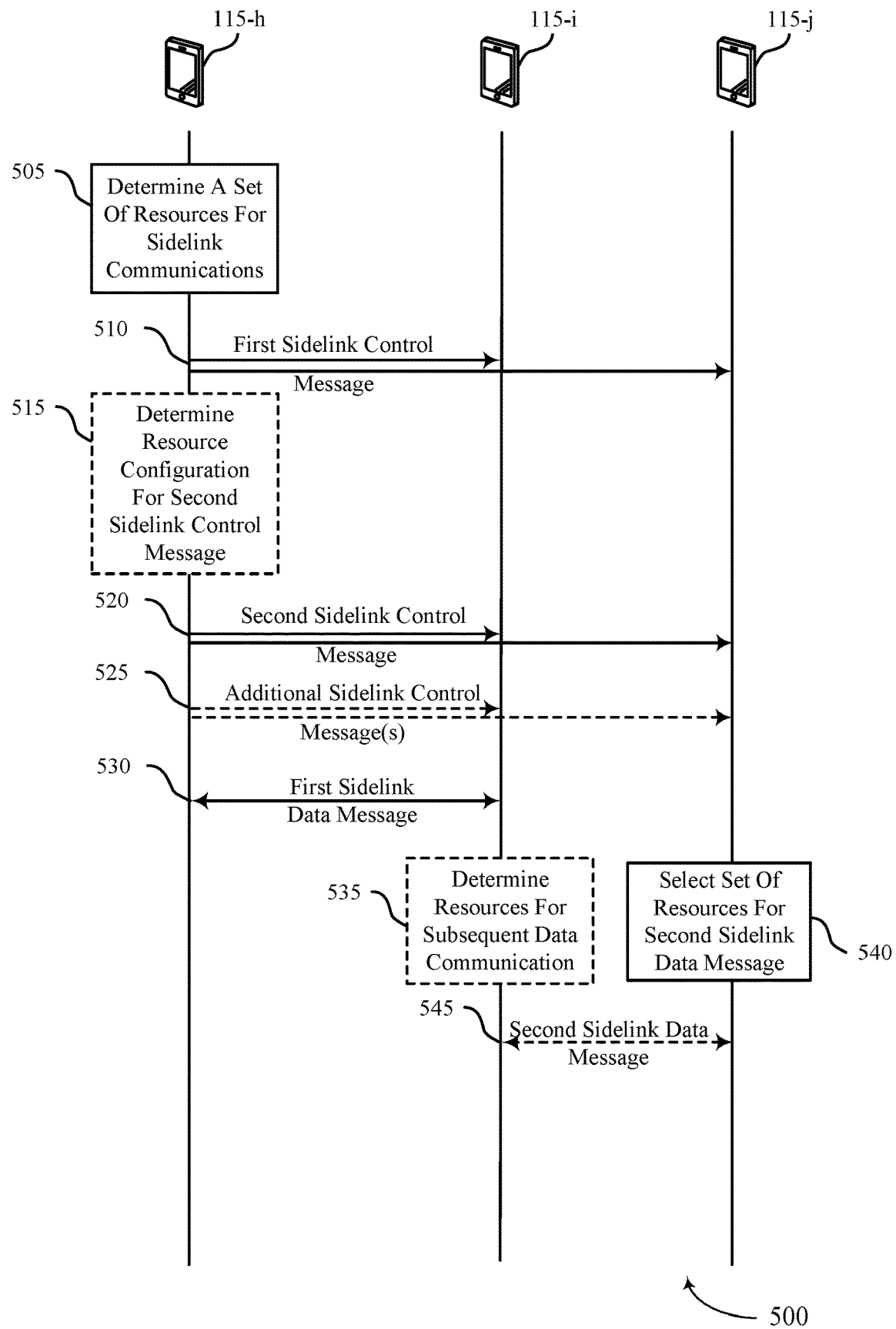
FIGS. 5 and 6 illustrates examples of process flows in a system in accordance with aspects of the present disclosure.

FIG. 5 illustrates an example of a process flow 500 in accordance with aspects of the present disclosure. In some examples, process flow 500 may implement aspects of wireless communications system 100, wireless communications system 200, resource diagram 300, resource diagrams 400, or a combination. The process flow 500 may illustrate an example of a transmitting UE 115, such as UE 115-*h*, reserving one or more resources for one or more data transmissions between UE 115-*h* and receiving UE 115-*i*, receiving UE 115-*j*, or both using multiple SCI messages (e.g., a primary SCI message and one or more ASCI messages). Alternative examples of the following may be implemented, where some processes are performed in a different order than described or are not performed. In some cases, processes may include additional features not mentioned below, or further processes may be added.

At 505, UE 115-*h* may determine a set of resources of a shared radio frequency spectrum band for sidelink communications with UE 115-*i*, UE 115-*j*, or both. The set of resources may include a subset of resources for transmission of a sidelink data message between UE 115-*h* and one or more other UEs 115 (e.g., UE 115-*i*) and another subset of resources for reception of the sidelink data message. In some examples, UE 115-*h* may determine the set of resources based on monitoring for a control message from a wireless device, decoding the control message to identify resources indicated as reserved by the control message, and determining the set of resources based on the resources indicated as reserved by the control message. In some cases, the set of resources may be nonoverlapping with the resources indicated as reserved by the control message.

At 510, UE 115-*h* may transmit a first sidelink control message to UE 115-*i* and UE 115-*j* using a subchannel (e.g., the subchannel with a lowest subchannel index of a set of subchannels). The first sidelink control message may reserve the set of resources for the sidelink data message and may be a primary SCI1 message.

At 515, UE 115-*h* may determine a resource configuration for a second sidelink control message. The resource configuration may indicate a configured (e.g., configured via control signaling or a fixed value at UE 115-*h*) number of subchannels for the second sidelink control message. In some examples, UE 115-*h* may transmit the resource configuration indicating the configured number of subchannels for the second sidelink control message to UE 115-*i*, UE 115-*j*, or both. In some cases, UE 115-*h* may transmit an indication of the second sidelink control message in the first sidelink control message. For example, UE 115-*h* may use a scrambling sequence of the first sidelink control message configured for the second sidelink control message.

At 520, UE 115-*h* may transmit a second sidelink control message (e.g., an ASCI message) indicating an additional set of resources of the shared radio frequency spectrum band for data communications and an availability status of the additional set of resources. The additional set of resources may include the resources indicated in the first sidelink control message (e.g., in the primary SCI1 message). In some cases, the additional set of resources may include one or more other resources based on the availability status of the resources. For example, the additional set of resources may be reserved for data communications, available for the data communications, recommended for the data communications, or a combination thereof. The activity status may additionally or alternatively include a sensing report indicating that the additional set of resources may be for collision avoidance. In some cases, UE 115-*h* may transmit the second sidelink control message in a subchannel different from the subchannel the first sidelink control message was transmitted in at 510. Additionally or alternatively, UE 115-*h* may transmit the second sidelink control message in a subchannel that may be the same as the subchannel the first sidelink control message was transmitted in at 510. In some examples, UE 115-*h* may transmit the second sidelink control message in a set of subchannels according to the configured number of subchannels at 515.

In some cases, the first sidelink control message may occupy a number of slots different from a number of slots occupied by the second sidelink control message in a subchannel. In some other cases, the first sidelink control message may occupy a number of slots that is the same as a number of slots occupied by the second sidelink control message in a subchannel.

At 525, UE 115-*h* may transmit one or more additional sidelink control messages, which may be repeated ASCI messages, to one or more neighboring UEs 115 (e.g., UE 115-*i* and UE 115-*j*) each indicating respective sets of resources for data communications and corresponding availability statuses. For example, UE 115-*h* may transmit a third sidelink control message that indicates the additional set of resources of the shared radio frequency spectrum band. The additional set of resources may include an aggregate of resources reserved for data communications by one or more transmitting devices, such as UE 115-*h*.

In some cases, UE 115-*h* may determine a set of resources available for data communications based on the first sidelink control message, the second sidelink control message, and one or more other control messages for the data communications (e.g., an SCI1 message, one or more ASCI messages, an SCI2 message, or a combination) and may transmit one or more additional sidelink control channels (e.g., PSCCHs) indicating the set of resources available for data communications. For example, UE 115-*h* may transmit each of the one or more additional sidelink control channels in a respective subchannel of a set of subchannels (e.g., including the subchannel used to transmit the first sidelink control message).

At 530, UE 115-*h* may communicate one or more sidelink data messages with one or more neighboring UEs 115. For example, UE 115-*h* may transmit the sidelink data message to UE 115-*i* using the subset of resources for transmitting the sidelink data message, receive the sidelink data message from UE 115-*i* using the subset of resources for receiving the sidelink data message, or both.

At 535, UE 115-*i* may determine one or more resources for a subsequent data communication by UE 115-*h* based on receiving one or more additional sidelink control channels indicating a set of resources available for data communications.

At 540, UE 115-*j* may select a set of resources for a second sidelink data message between UE 115-*j* and another UE 115, such as UE 115-*i*, based on the first sidelink control message and the second sidelink control message. For example, UE 115-*j* may select a set of resources that may not include the resources indicated as reserved by the first sidelink control message and the second sidelink control message. That is, UE 115-*j* may receive the indication of the reserved resources in the first sidelink control message and the second sidelink control message from UE 115-*h*, and may avoid, or refrain from, using those reserved resources for an additional sidelink data message (e.g., not scheduled for the reserved resources). In some cases, the first sidelink control message may include an indication of the second sidelink control message.

At 545, UE 115-*j* may communicate the second sidelink data message with UE 115-*i*. For example, UE 115-*j* may transmit the second sidelink data message using a subset of resources for transmitting or receive the second sidelink data message using a subset of resources for receiving.

Figure 6:
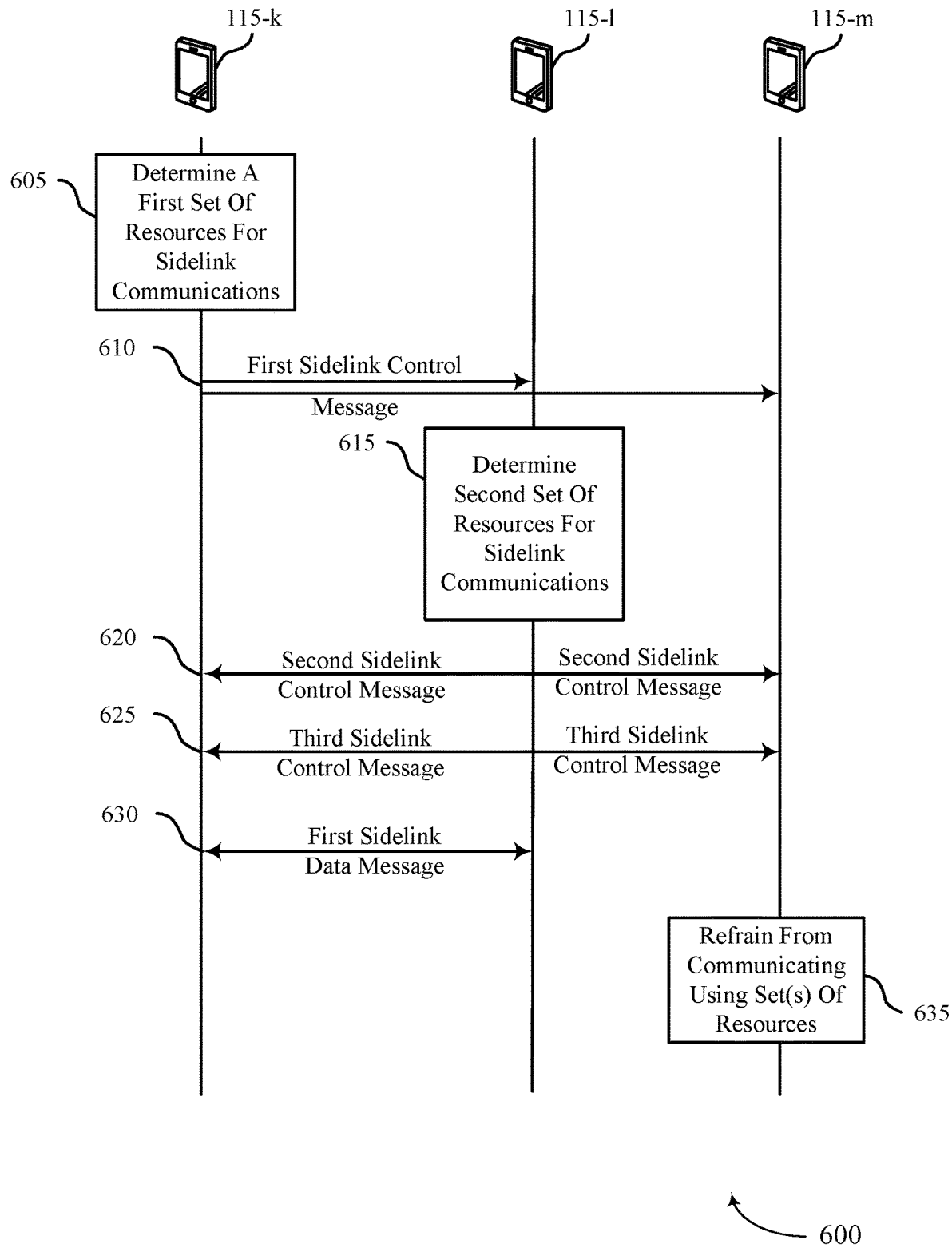

FIG. 6 illustrates an example of a process flow 600 in accordance with aspects of the present disclosure. In some examples, process flow 600 may implement aspects of wireless communications system 100, wireless communications system 200, resource diagram 300, resource diagrams 400, or a combination. The process flow 600 may illustrate an example of one or more transmitting UEs 115, such as UE 115-*k* and UE 115-*l*, reserving one or more resources for one or more data transmissions between UE 115-*k* and receiving UE 115-*l*, receiving UE 115-*m*, or both using multiple SCI messages (e.g., a primary SCI message and one or more ASCI messages). Alternative examples of the following may be implemented, where some processes are performed in a different order than described or are not performed. In some cases, processes may include additional features not mentioned below, or further processes may be added.

At 605, UE 115-*k* may determine a first set of resources of a shared radio frequency spectrum band for sidelink communications with UE 115-*l*, UE 115-*m*, or both, or another wireless device in some cases. For instance, the first set of resources may include a subset of resources for transmission of a sidelink data message between UE 115-*k* and one or more other UEs 115 (e.g., UE 115-*l*) and another subset of resources for reception of the sidelink data message. In some examples, UE 115-*k* may determine the set of resources based on monitoring for a control message from a wireless device, decoding the control message to identify resources indicated as reserved by the control message, and determining the set of resources based on the resources indicated as reserved by the control message. In some cases, the set of resources may be nonoverlapping with the resources indicated as reserved by the control message.

At 610, UE 115-*k* may transmit (e.g., broadcast) a first sidelink control message, which may be received by UE 115-*l* and UE 115-*m* using a subchannel (e.g., the subchannel with a lowest subchannel index of a set of subchannels). The first sidelink control message may reserve the first set of resources for the sidelink data message and may be a primary SCI1 message.

At 615, UE 115-*l* may determine a second set of resources for sidelink communications such as a second sidelink data message. The second set of resources may include resources that are different from the first set of resources.

At 620, UE 115-*l* may transmit a second sidelink control message to UE 115-*k*, UE 115-*m*, or both reserving the second set of resources for the second sidelink data message. The second sidelink control message may be a primary SCI1 message different from the primary SCI1 at 610. In some examples, the second control message may include an indication of an additional SCI message, such as an ASCI message.

At 625, UE 115-*l* may transmit a third sidelink control message to UE 115-*k*, UE 115-*m*, or both indicating the first set of resources or the second set of resources. The third sidelink control message may be an ASCI message. The ASCI message may be a copy of or include information of the first sidelink control message transmitted by UE 115-*k*. Additionally or alternatively, the ASCI message may include an indication of recommended resources, a sensing report, or the like. In some cases, UE 115-*m* may decode the one or more sidelink control messages (e.g., the primary SCI1 message from UE 115-*k*, the primary SCI1 message from UE 115-*l*, the ASCI message from UE 115-*l*, or a combination).

In some aspects, a receiving UE 115, such as UE 115-*l*, may perform resource reservation reassurance based on the first set of resources, the second set of resources, or both. Performing the resource reservation reassurance may include UE 115-*l* receiving the first sidelink control message from UE 115-*k* indicating the first set of reserved resources for transmissions to UE 115-*l* and retransmitting (e.g., repeating) the resource reservation indication to one or more other UEs 115, such as UE 115-*j*. For instance, UE 115-*l* may transmit control messages including the indication of the reserved resources, other resource reservation reassurance information, or both. In some examples, UE 115-*l* may transmit the second control message (e.g., primary SCI1), the third control message (e.g., ASCI), or both to convey the resource reservation reassurance information.

At 630, UE 115-*k* may communicate one or more sidelink data messages with one or more neighboring UEs 115. For example, UE 115-*k* may transmit the sidelink data message to UE 115-*l* using the subset of resources for transmitting the sidelink data message, receive the sidelink data message from UE 115-*l* using the subset of resources for receiving the sidelink data message, or both.

At 635, UE 115-*m* may refrain from communicating using the first set of resources, the second set of resources, or both based on receiving the one or more sidelink control messages. For example, UE 115-*m* may determine which resources are available for sidelink communications based on the sidelink control messages, and may refrain from using the unavailable (e.g., reserved, recommended, or indicated in the sensing report) resources.

Figure 7:
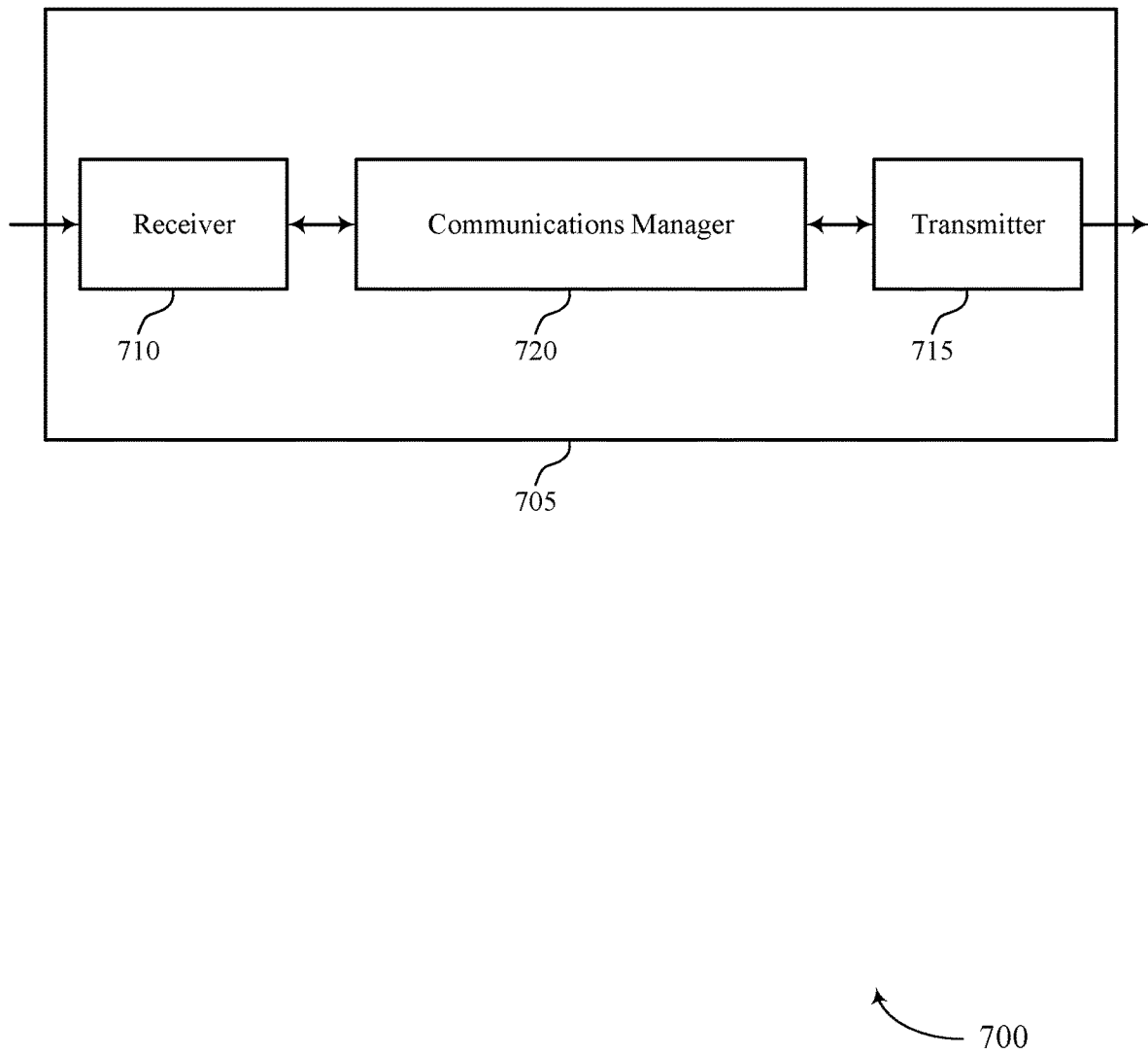
FIGS. 7 and 8 show block diagrams of devices in accordance with aspects of the present disclosure.

FIG. 7 shows a block diagram 700 of a device 705 in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to SCI signaling for wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to SCI signaling for wireless communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of SCI signaling for wireless communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for determining a first set of resources of a shared radio frequency spectrum band for sidelink communications, the first set of resources including a first subset of resources for transmission of a sidelink data message between the first UE and a second UE and a second subset of resources for reception of the sidelink data message. The communications manager 720 may be configured as or otherwise support a means for transmitting, using a first subchannel of the shared radio frequency spectrum band, a first sidelink control message reserving the first set of resources for the sidelink data message. The communications manager 720 may be configured as or otherwise support a means for transmitting a second sidelink control message that indicates a second set of resources of the shared radio frequency spectrum band for data communications and an availability status of the second set of resources. The communications manager 720 may be configured as or otherwise support a means for communicating the sidelink data message with the second UE, where communicating includes transmitting the sidelink data message using the first subset of resources or receiving the sidelink data message using the second subset of resources.

Additionally or alternatively, the communications manager 720 may support wireless communications at a second UE in accordance with examples as disclosed herein. For example, the communications manager 720 may be configured as or otherwise support a means for receiving, using a first subchannel of a shared radio frequency spectrum band, a first sidelink control message reserving a first set of resources for a sidelink data message between a first UE and the second UE, the first set of resources including a first subset of resources for transmission of the sidelink data message and a second subset of resources for reception of the sidelink data message. The communications manager 720 may be configured as or otherwise support a means for receiving a second sidelink control message that indicates a second set of resources of the shared radio frequency spectrum band for data communications and an availability status of the second set of resources. The communications manager 720 may be configured as or otherwise support a means for communicating the sidelink data message with the first UE, where communicating includes transmitting the sidelink data message using the first subset of resources or receiving the sidelink data message using the second subset of resources.

Additionally or alternatively, the communications manager 720 may support wireless communications at a second UE in accordance with examples as disclosed herein. For example, the communications manager 720 may be configured as or otherwise support a means for receiving, using a first subchannel of a shared radio frequency spectrum band, a first sidelink control message reserving a first set of resources for a first sidelink data message between a first UE and a third UE. The communications manager 720 may be configured as or otherwise support a means for receiving a second sidelink control message that indicates a second set of resources of the shared radio frequency spectrum band for data communications and an availability status of the second set of resources. The communications manager 720 may be configured as or otherwise support a means for selecting a third set of resources for a second sidelink data message between the second UE and a fourth UE based on the first sidelink control message and the second sidelink control message, the third set of resources including a first subset of resources for transmission of the second sidelink data message and a second subset of resources for reception of the second sidelink data message. The communications manager 720 may be configured as or otherwise support a means for communicating the second sidelink data message with the fourth UE, where communicating includes transmitting the second sidelink data message using the first subset of resources or receiving the second sidelink data message using the second subset of resources.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reducing interference for sidelink communications through the use of multiple sidelink control messages including first stage SCI (e.g., SCI1), second stage SCI (e.g., SCI2), and one or more other additional SCI messages (ASCI1, ASCI2, etc.). Such techniques may enable a UE to transmit multiple sidelink control messages to indicate reserved resources, available resources, a sensing report, or any combination thereof in ASCI, which may reduce interference, increase throughput, and allow for efficient utilization of communication resources.

Figure 8:
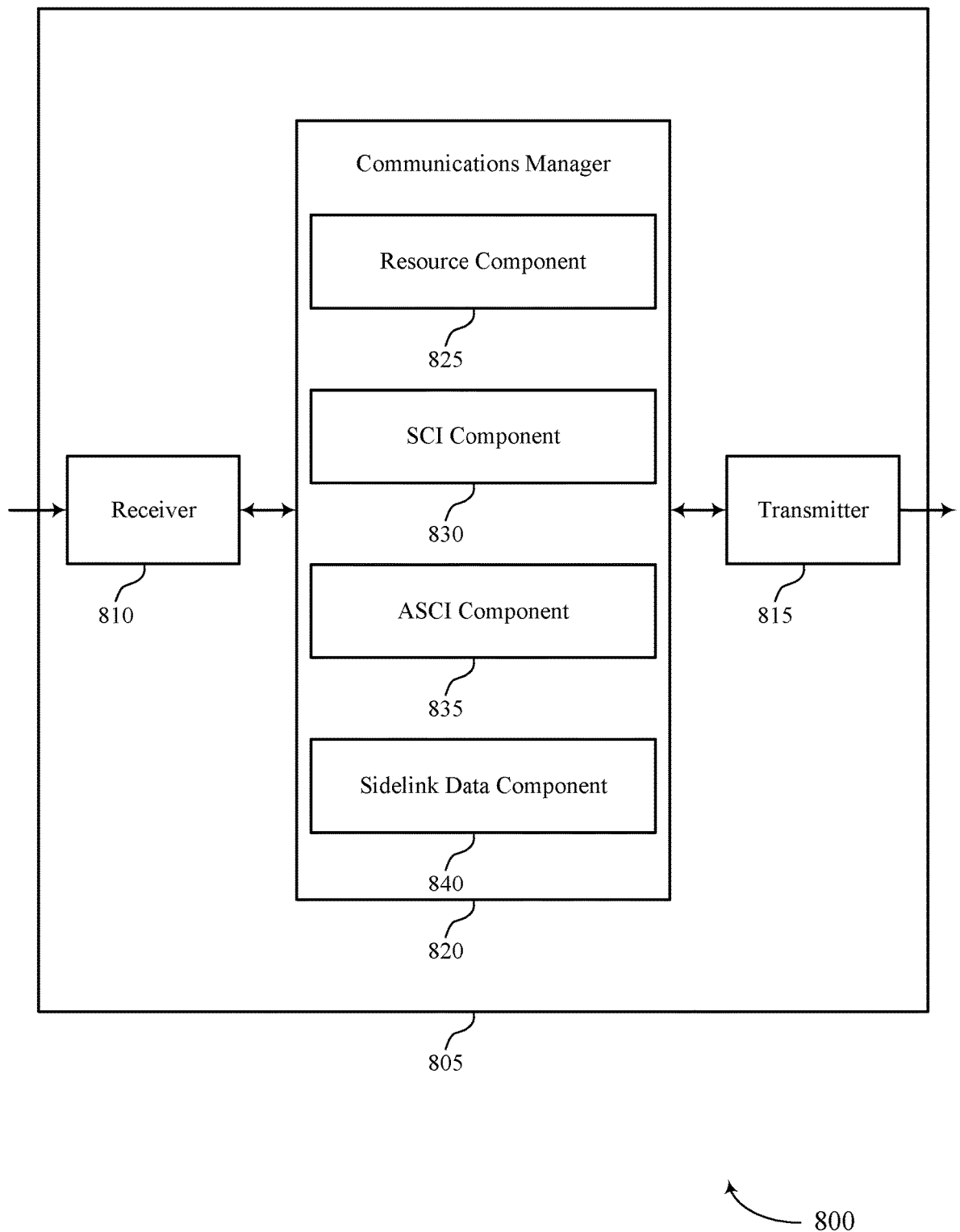

FIG. 8 shows a block diagram 800 of a device 805 in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to SCI signaling for wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to SCI signaling for wireless communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of SCI signaling for wireless communications as described herein. For example, the communications manager 820 may include a resource component 825, an SCI component 830, an ASCI component 835, a sidelink data component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The resource component 825 may be configured as or otherwise support a means for determining a first set of resources of a shared radio frequency spectrum band for sidelink communications, the first set of resources including a first subset of resources for transmission of a sidelink data message between the first UE and a second UE and a second subset of resources for reception of the sidelink data message. The SCI component 830 may be configured as or otherwise support a means for transmitting, using a first subchannel of the shared radio frequency spectrum band, a first sidelink control message reserving the first set of resources for the sidelink data message. The ASCI component 835 may be configured as or otherwise support a means for transmitting a second sidelink control message that indicates a second set of resources of the shared radio frequency spectrum band for data communications and an availability status of the second set of resources. The sidelink data component 840 may be configured as or otherwise support a means for communicating the sidelink data message with the second UE, where communicating includes transmitting the sidelink data message using the first subset of resources or receiving the sidelink data message using the second subset of resources.

Additionally or alternatively, the communications manager 820 may support wireless communications at a second UE in accordance with examples as disclosed herein. The SCI component 830 may be configured as or otherwise support a means for receiving, using a first subchannel of a shared radio frequency spectrum band, a first sidelink control message reserving a first set of resources for a sidelink data message between a first UE and the second UE, the first set of resources including a first subset of resources for transmission of the sidelink data message and a second subset of resources for reception of the sidelink data message. The ASCI component 835 may be configured as or otherwise support a means for receiving a second sidelink control message that indicates a second set of resources of the shared radio frequency spectrum band for data communications and an availability status of the second set of resources. The sidelink data component 840 may be configured as or otherwise support a means for communicating the sidelink data message with the first UE, where communicating includes transmitting the sidelink data message using the first subset of resources or receiving the sidelink data message using the second subset of resources.

Additionally or alternatively, the communications manager 820 may support wireless communications at a second UE in accordance with examples as disclosed herein. The SCI component 830 may be configured as or otherwise support a means for receiving, using a first subchannel of a shared radio frequency spectrum band, a first sidelink control message reserving a first set of resources for a first sidelink data message between a first UE and a third UE. The ASCI component 835 may be configured as or otherwise support a means for receiving a second sidelink control message that indicates a second set of resources of the shared radio frequency spectrum band for data communications and an availability status of the second set of resources. The resource component 825 may be configured as or otherwise support a means for selecting a third set of resources for a second sidelink data message between the second UE and a fourth UE based on the first sidelink control message and the second sidelink control message, the third set of resources including a first subset of resources for transmission of the second sidelink data message and a second subset of resources for reception of the second sidelink data message. The sidelink data component 840 may be configured as or otherwise support a means for communicating the second sidelink data message with the fourth UE, where communicating includes transmitting the second sidelink data message using the first subset of resources or receiving the second sidelink data message using the second subset of resources.

Figure 9:
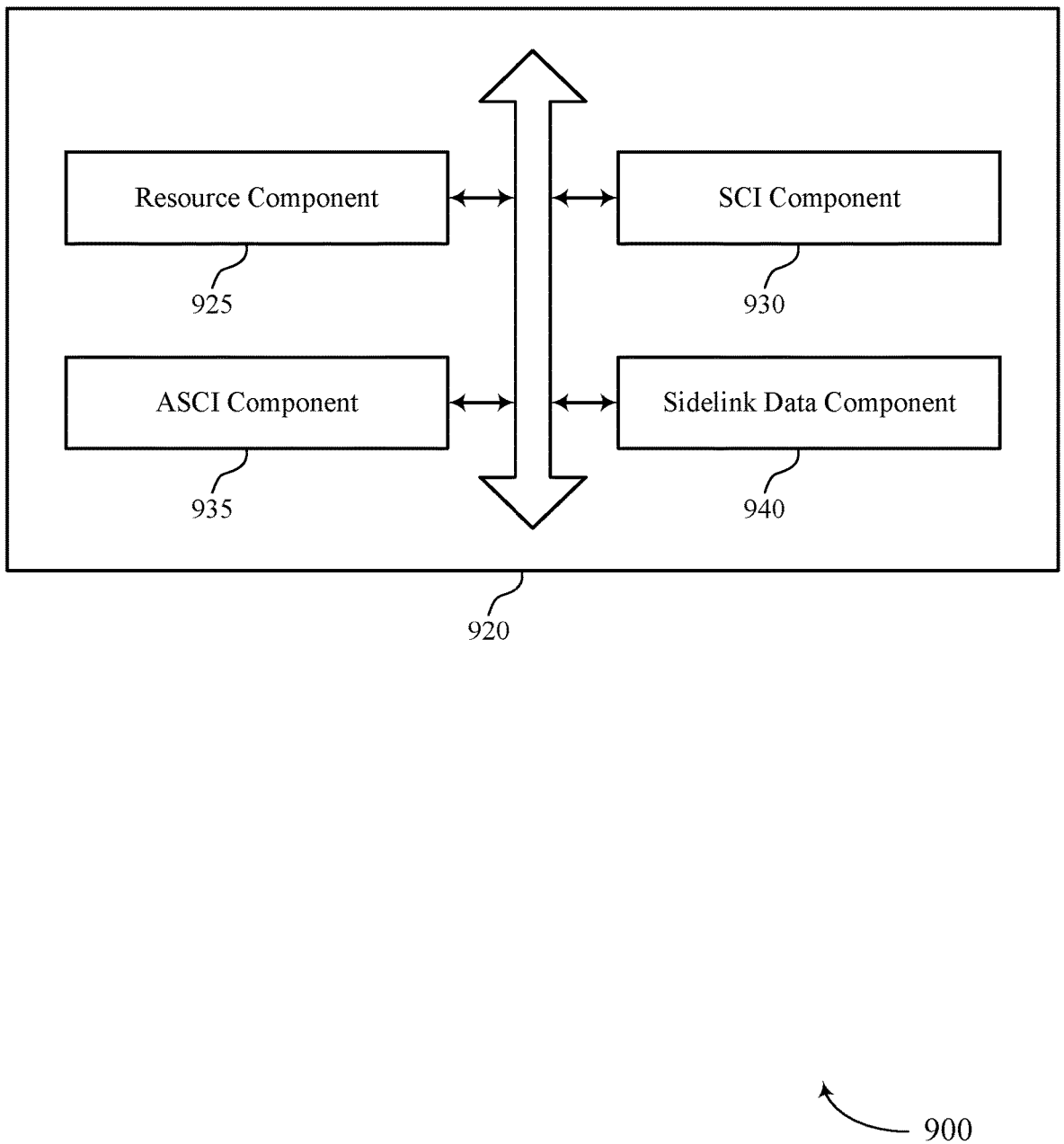
FIG. 9 shows a block diagram of a communications manager in accordance with aspects of the present disclosure.

FIG. 9 shows a block diagram 900 of a communications manager 920 in accordance with aspects of the present disclosure. The communications manager 920 may be an example of aspects of a communications manager 720, a communications manager 820, or both, as described herein.

The communications manager 920, or various components thereof, may be an example of means for performing various aspects of SCI signaling for wireless communications as described herein. For example, the communications manager 920 may include a resource component 925, an SCI component 930, an ASCI component 935, a sidelink data component 940, or any combination thereof. Each of these components may communicate, directly or indirectly, with one another (e.g., via one or more buses).

The communications manager 920 may support wireless communications at a first UE in accordance with examples as disclosed herein. The resource component 925 may be configured as or otherwise support a means for determining a first set of resources of a shared radio frequency spectrum band for sidelink communications, the first set of resources including a first subset of resources for transmission of a sidelink data message between the first UE and a second UE and a second subset of resources for reception of the sidelink data message. The SCI component 930 may be configured as or otherwise support a means for transmitting, using a first subchannel of the shared radio frequency spectrum band, a first sidelink control message reserving the first set of resources for the sidelink data message. The ASCI component 935 may be configured as or otherwise support a means for transmitting a second sidelink control message that indicates a second set of resources of the shared radio frequency spectrum band for data communications and an availability status of the second set of resources. The sidelink data component 940 may be configured as or otherwise support a means for communicating the sidelink data message with the second UE, where communicating includes transmitting the sidelink data message using the first subset of resources or receiving the sidelink data message using the second subset of resources.

In some examples, the ASCI component 935 may be configured as or otherwise support a means for transmitting a set of multiple additional sidelink control messages, each indicating respective sets of resources for data communications and corresponding availability statuses.

In some examples, the ASCI component 935 may be configured as or otherwise support a means for transmitting the second sidelink control message in a second subchannel of the shared radio frequency spectrum band, the second subchannel different from the first subchannel. In some examples, the first subchannel has a lowest subchannel index of a set of subchannels including the first subchannel and the second subchannel. In some examples, the ASCI component 935 may be configured as or otherwise support a means for transmitting the second sidelink control message in the first subchannel of the shared radio frequency spectrum band.

In some examples, the ASCI component 935 may be configured as or otherwise support a means for transmitting a third sidelink control message that indicates the second set of resources of the shared radio frequency spectrum band, the second set of resources including an aggregate of resources reserved for data communications by one or more transmitting devices.

In some examples, the SCI component 930 may be configured as or otherwise support a means for transmitting an indication of the second sidelink control message in the first sidelink control message, where the indication is based on a scrambling sequence of the first sidelink control message configured for the second sidelink control message.

In some examples, the resource component 925 may be configured as or otherwise support a means for determining a resource configuration for the second sidelink control message, where the resource configuration indicates a configured number of subchannels for the second sidelink control message. In some examples, the resource component 925 may be configured as or otherwise support a means for transmitting the second sidelink control message in a set of subchannels according to the configured number of subchannels. In some examples, the resource component 925 may be configured as or otherwise support a means for transmitting, to the second UE, the resource configuration indicating the configured number of subchannels for the second sidelink control message.

In some examples, the resource component 925 may be configured as or otherwise support a means for determining a set of resources available for data communications based on the first sidelink control message, the second sidelink control message, and one or more other control messages associated with data communications. In some examples, the resource component 925 may be configured as or otherwise support a means for transmitting one or more additional sidelink control channels indicating the set of resources available for data communications, where each of the one or more additional sidelink control channels is transmitted in a respective subchannel of a set of subchannels including the first subchannel.

In some examples, to support determining the first set of resources, the SCI component 930 may be configured as or otherwise support a means for monitoring for a control message from a wireless device. In some examples, to support determining the first set of resources, the SCI component 930 may be configured as or otherwise support a means for decoding the control message to identify resources indicated as reserved by the control message. In some examples, to support determining the first set of resources, the SCI component 930 may be configured as or otherwise support a means for determining the first set of resources based on the resources indicated as reserved by the control message, the first set of resources nonoverlapping with the resources indicated as reserved by the control message.

In some examples, the first sidelink control message includes a first number of slots in the first subchannel and the second sidelink control message includes a second number of slots different from the first number of slots. In some examples, the first sidelink control message includes a first number of slots in the first subchannel and the second sidelink control message includes a second number of slots that is the same as the first number of slots. In some examples, the availability status includes an indication that the second set of resources is reserved for data communications, the second set of resources is available for the data communications, or a sensing report indicating that the second set of resources is for collision avoidance.

Additionally or alternatively, the communications manager 920 may support wireless communications at a second UE in accordance with examples as disclosed herein. In some examples, the SCI component 930 may be configured as or otherwise support a means for receiving, using a first subchannel of a shared radio frequency spectrum band, a first sidelink control message reserving a first set of resources for a sidelink data message between a first UE and the second UE, the first set of resources including a first subset of resources for transmission of the sidelink data message and a second subset of resources for reception of the sidelink data message. In some examples, the ASCI component 935 may be configured as or otherwise support a means for receiving a second sidelink control message that indicates a second set of resources of the shared radio frequency spectrum band for data communications and an availability status of the second set of resources. In some examples, the sidelink data component 940 may be configured as or otherwise support a means for communicating the sidelink data message with the first UE, where communicating includes transmitting the sidelink data message using the first subset of resources or receiving the sidelink data message using the second subset of resources.

In some examples, the ASCI component 935 may be configured as or otherwise support a means for receiving a set of multiple additional sidelink control messages, each indicating respective sets of resources for data communications and corresponding availability statuses. In some examples, the ASCI component 935 may be configured as or otherwise support a means for receiving the second sidelink control message in a second subchannel of the shared radio frequency spectrum band, the second subchannel different from the first subchannel. In some examples, the first subchannel has a lowest subchannel index of a set of subchannels including the first subchannel and the second subchannel. In some examples, the ASCI component 935 may be configured as or otherwise support a means for receiving the second sidelink control message in the first subchannel of the shared radio frequency spectrum band.

In some examples, the ASCI component 935 may be configured as or otherwise support a means for receiving a third sidelink control message that indicates the second set of resources of the shared radio frequency spectrum band, the second set of resources including an aggregate of resources reserved for data communications by one or more transmitting devices.

In some examples, the SCI component 930 may be configured as or otherwise support a means for receiving an indication of the second sidelink control message in the first sidelink control message, where the indication is based on a scrambling sequence of the first sidelink control message configured for the second sidelink control message.

In some examples, the resource component 925 may be configured as or otherwise support a means for determining a resource configuration for the second sidelink control message, where the resource configuration indicates a configured number of subchannels for the second sidelink control message. In some examples, the resource component 925 may be configured as or otherwise support a means for monitoring for the second sidelink control message in a set of subchannels according to the configured number of subchannels.

In some examples, the resource component 925 may be configured as or otherwise support a means for receiving one or more additional sidelink control channels indicating a set of resources available for data communications, where each of the one or more additional sidelink control channels is received in a respective subchannel of a set of subchannels including the first subchannel. In some examples, the resource component 925 may be configured as or otherwise support a means for determining resources for a subsequent data communication by the second UE based on the set of resources available for data communications.

In some examples, the first sidelink control message includes a first number of slots in the first subchannel and the second sidelink control message includes a second number of slots different from the first number of slots. In some examples, the first sidelink control message includes a first number of slots in the first subchannel and the second sidelink control message includes a second number of slots that is the same as the first number of slots. In some examples, the availability status includes an indication that the second set of resources are reserved for the data communications, the second set of resources are recommended for the data communications, or a sensing report associated with the second set of resources.

Additionally or alternatively, the communications manager 920 may support wireless communications at a second UE in accordance with examples as disclosed herein. In some examples, the SCI component 930 may be configured as or otherwise support a means for receiving, using a first subchannel of a shared radio frequency spectrum band, a first sidelink control message reserving a first set of resources for a first sidelink data message between a first UE and a third UE. In some examples, the ASCI component 935 may be configured as or otherwise support a means for receiving a second sidelink control message that indicates a second set of resources of the shared radio frequency spectrum band for data communications and an availability status of the second set of resources. In some examples, the resource component 925 may be configured as or otherwise support a means for selecting a third set of resources for a second sidelink data message between the second UE and a fourth UE based on the first sidelink control message and the second sidelink control message, the third set of resources including a first subset of resources for transmission of the second sidelink data message and a second subset of resources for reception of the second sidelink data message. In some examples, the sidelink data component 940 may be configured as or otherwise support a means for communicating the second sidelink data message with the fourth UE, where communicating includes transmitting the second sidelink data message using the first subset of resources or receiving the second sidelink data message using the second subset of resources.

In some examples, the resource component 925 may be configured as or otherwise support a means for refraining from communicating the second sidelink data message using the first set of resources and the second set of resources based on the availability status indicating that the second set of resources is reserved for data communications or associated with collision avoidance. In some examples, the first sidelink control message includes an indication of the second sidelink control message.

Figure 10:
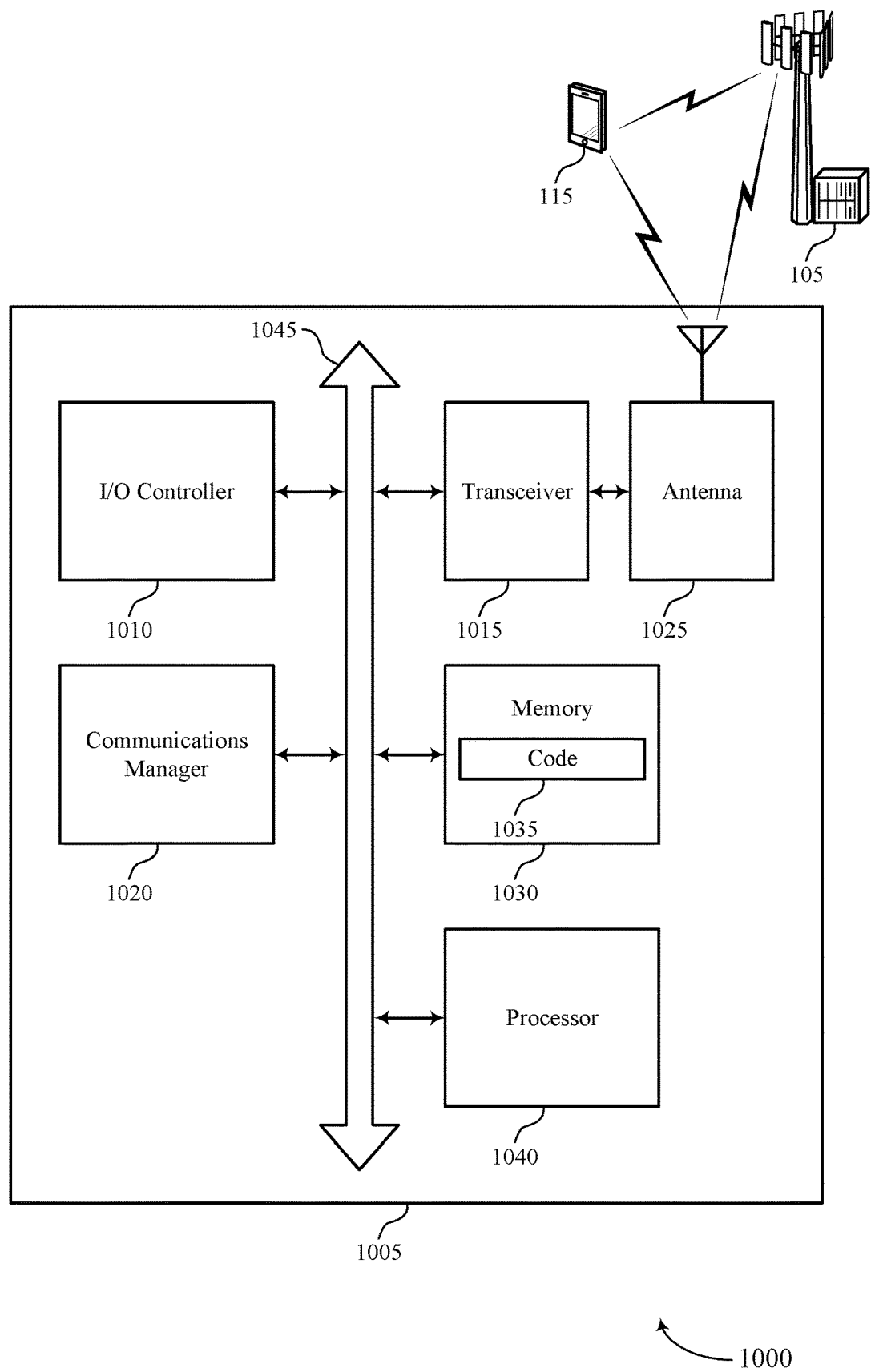
FIG. 10 shows a diagram of a system including a device in accordance with aspects of the present disclosure.

FIG. 10 shows a diagram of a system 1000 including a device 1005 in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting SCI signaling for wireless communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for determining a first set of resources of a shared radio frequency spectrum band for sidelink communications, the first set of resources including a first subset of resources for transmission of a sidelink data message between the first UE and a second UE and a second subset of resources for reception of the sidelink data message. The communications manager 1020 may be configured as or otherwise support a means for transmitting, using a first subchannel of the shared radio frequency spectrum band, a first sidelink control message reserving the first set of resources for the sidelink data message. The communications manager 1020 may be configured as or otherwise support a means for transmitting a second sidelink control message that indicates a second set of resources of the shared radio frequency spectrum band for data communications and an availability status of the second set of resources. The communications manager 1020 may be configured as or otherwise support a means for communicating the sidelink data message with the second UE, where communicating includes transmitting the sidelink data message using the first subset of resources or receiving the sidelink data message using the second subset of resources.

Additionally or alternatively, the communications manager 1020 may support wireless communications at a second UE in accordance with examples as disclosed herein. For example, the communications manager 1020 may be configured as or otherwise support a means for receiving, using a first subchannel of a shared radio frequency spectrum band, a first sidelink control message reserving a first set of resources for a sidelink data message between a first UE and the second UE, the first set of resources including a first subset of resources for transmission of the sidelink data message and a second subset of resources for reception of the sidelink data message. The communications manager 1020 may be configured as or otherwise support a means for receiving a second sidelink control message that indicates a second set of resources of the shared radio frequency spectrum band for data communications and an availability status of the second set of resources. The communications manager 1020 may be configured as or otherwise support a means for communicating the sidelink data message with the first UE, where communicating includes transmitting the sidelink data message using the first subset of resources or receiving the sidelink data message using the second subset of resources.

Additionally or alternatively, the communications manager 1020 may support wireless communications at a second UE in accordance with examples as disclosed herein. For example, the communications manager 1020 may be configured as or otherwise support a means for receiving, using a first subchannel of a shared radio frequency spectrum band, a first sidelink control message reserving a first set of resources for a first sidelink data message between a first UE and a third UE. The communications manager 1020 may be configured as or otherwise support a means for receiving a second sidelink control message that indicates a second set of resources of the shared radio frequency spectrum band for data communications and an availability status of the second set of resources. The communications manager 1020 may be configured as or otherwise support a means for selecting a third set of resources for a second sidelink data message between the second UE and a fourth UE based on the first sidelink control message and the second sidelink control message, the third set of resources including a first subset of resources for transmission of the second sidelink data message and a second subset of resources for reception of the second sidelink data message. The communications manager 1020 may be configured as or otherwise support a means for communicating the second sidelink data message with the fourth UE, where communicating includes transmitting the second sidelink data message using the first subset of resources or receiving the second sidelink data message using the second subset of resources.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, due to reduced blind decoding complexity (e.g., by transmitting multiple SCI messages to increase redundancy).

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of SCI signaling for wireless communications as described herein, or the processor 1040 and the memory 1030 may be otherwise configured to perform or support such operations.

Figure 11:
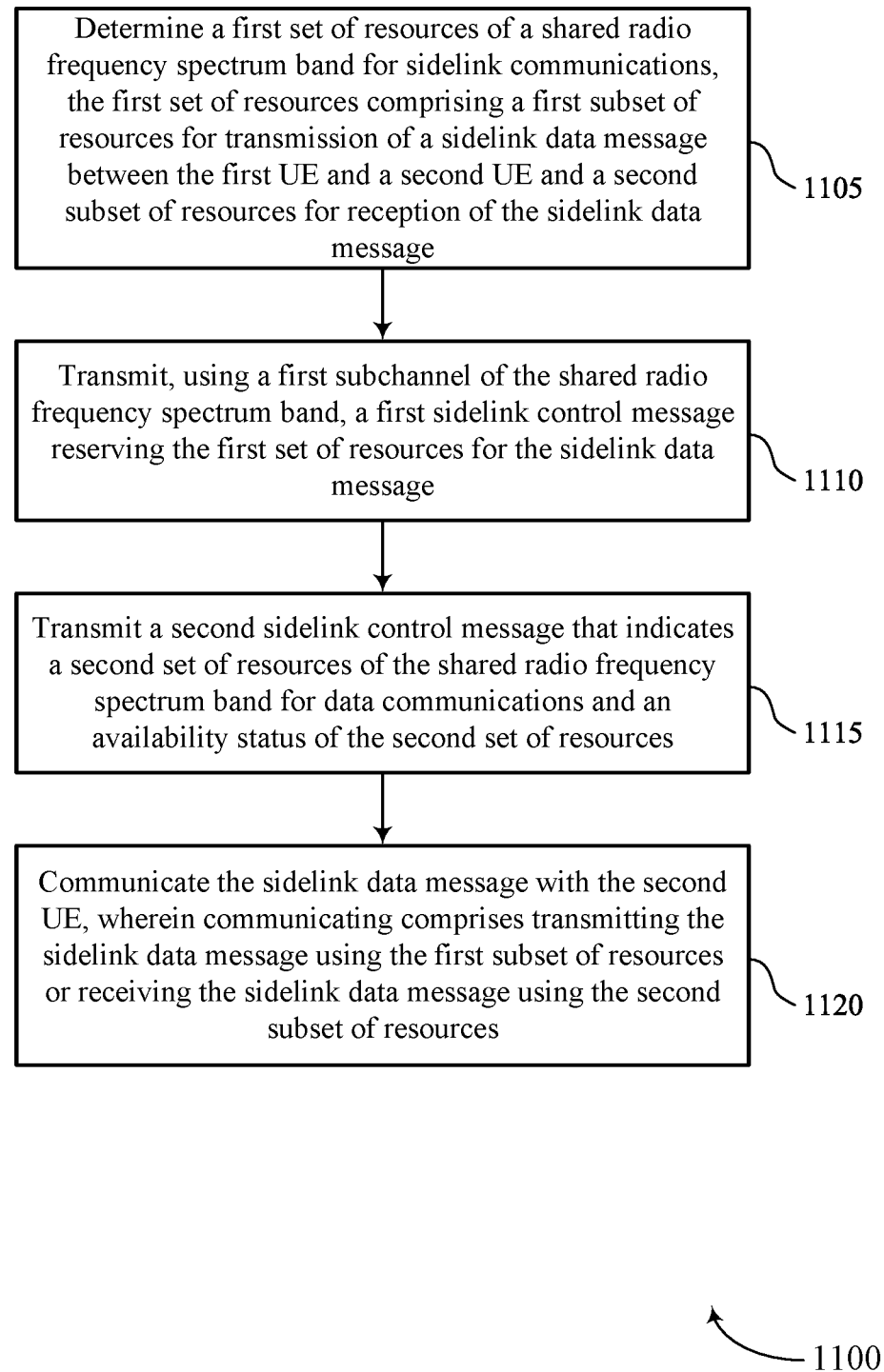
FIGS. 11 through 15 show flowcharts illustrating methods in accordance with aspects of the present disclosure.

FIG. 11 shows a flowchart illustrating a method 1100 in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1105, the method may include determining a first set of resources of a shared radio frequency spectrum band for sidelink communications, the first set of resources including a first subset of resources for transmission of a sidelink data message between the first UE and a second UE and a second subset of resources for reception of the sidelink data message. The operations of 1105 may be performed in accordance with examples as disclosed herein. In some examples, aspects of the operations of 1105 may be performed by a resource component 925 as described with reference to FIG. 9.

At 1110, the method may include transmitting, using a first subchannel of the shared radio frequency spectrum band, a first sidelink control message reserving the first set of resources for the sidelink data message. The operations of 1110 may be performed in accordance with examples as disclosed herein. In some examples, aspects of the operations of 1110 may be performed by an SCI component 930 as described with reference to FIG. 9.

At 1115, the method may include transmitting a second sidelink control message that indicates a second set of resources of the shared radio frequency spectrum band for data communications and an availability status of the second set of resources. The operations of 1115 may be performed in accordance with examples as disclosed herein. In some examples, aspects of the operations of 1115 may be performed by an ASCI component 935 as described with reference to FIG. 9.

At 1120, the method may include communicating the sidelink data message with the second UE, where communicating includes transmitting the sidelink data message using the first subset of resources or receiving the sidelink data message using the second subset of resources. The operations of 1120 may be performed in accordance with examples as disclosed herein. In some examples, aspects of the operations of 1120 may be performed by a sidelink data component 940 as described with reference to FIG. 9.

Figure 12:
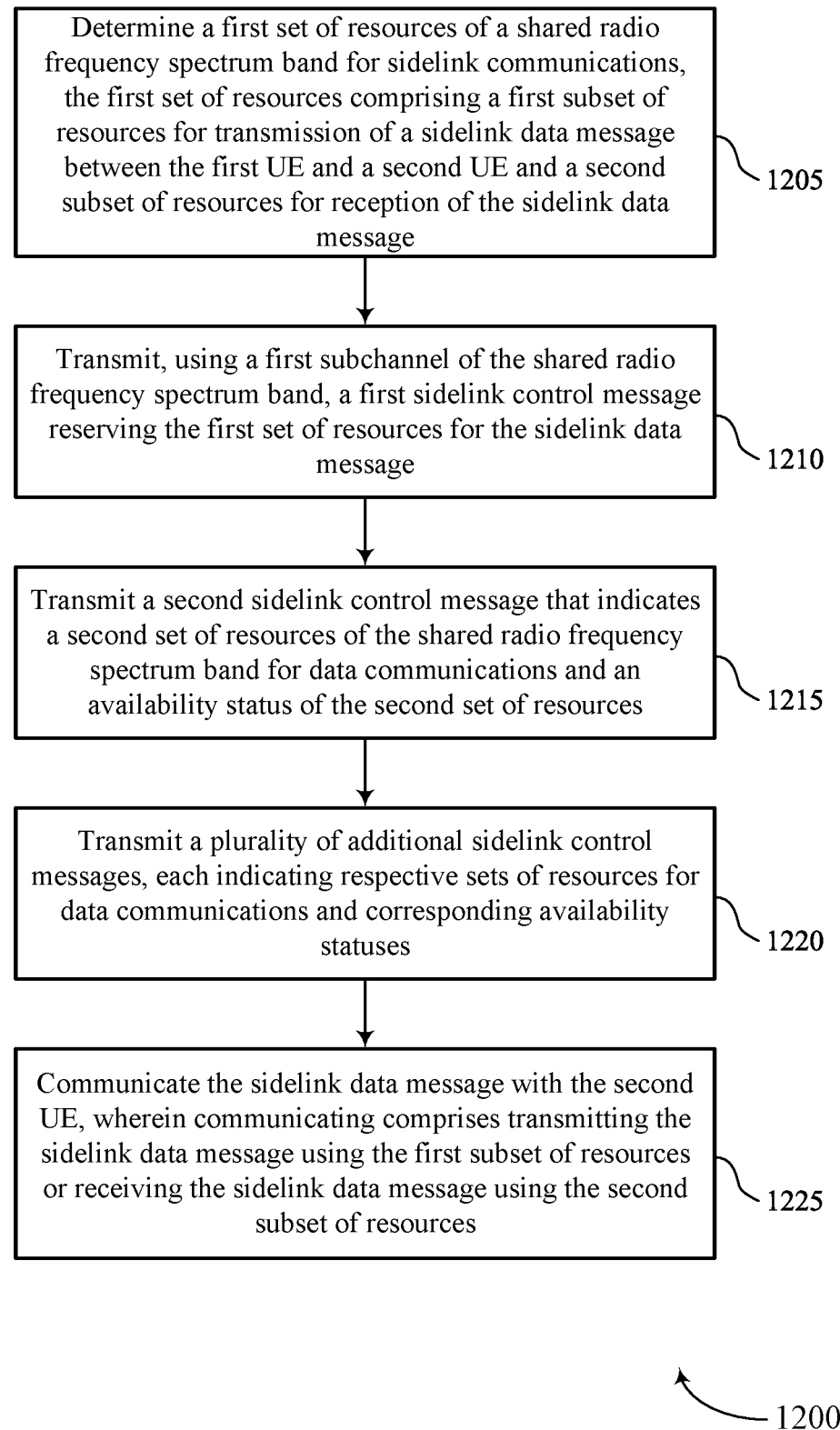

FIG. 12 shows a flowchart illustrating a method 1200 in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include determining a first set of resources of a shared radio frequency spectrum band for sidelink communications, the first set of resources including a first subset of resources for transmission of a sidelink data message between the first UE and a second UE and a second subset of resources for reception of the sidelink data message. The operations of 1205 may be performed in accordance with examples as disclosed herein. In some examples, aspects of the operations of 1205 may be performed by a resource component 925 as described with reference to FIG. 9.

At 1210, the method may include transmitting, using a first subchannel of the shared radio frequency spectrum band, a first sidelink control message reserving the first set of resources for the sidelink data message. The operations of 1210 may be performed in accordance with examples as disclosed herein. In some examples, aspects of the operations of 1210 may be performed by an SCI component 930 as described with reference to FIG. 9.

At 1215, the method may include transmitting a second sidelink control message that indicates a second set of resources of the shared radio frequency spectrum band for data communications and an availability status of the second set of resources. The operations of 1215 may be performed in accordance with examples as disclosed herein. In some examples, aspects of the operations of 1215 may be performed by an ASCI component 935 as described with reference to FIG. 9.

At 1220, the method may include transmitting a set of multiple additional sidelink control messages, each indicating respective sets of resources for data communications and corresponding availability statuses. The operations of 1220 may be performed in accordance with examples as disclosed herein. In some examples, aspects of the operations of 1220 may be performed by an ASCI component 935 as described with reference to FIG. 9.

At 1225, the method may include communicating the sidelink data message with the second UE, where communicating includes transmitting the sidelink data message using the first subset of resources or receiving the sidelink data message using the second subset of resources. The operations of 1225 may be performed in accordance with examples as disclosed herein. In some examples, aspects of the operations of 1225 may be performed by a sidelink data component 940 as described with reference to FIG. 9.

Figure 13:
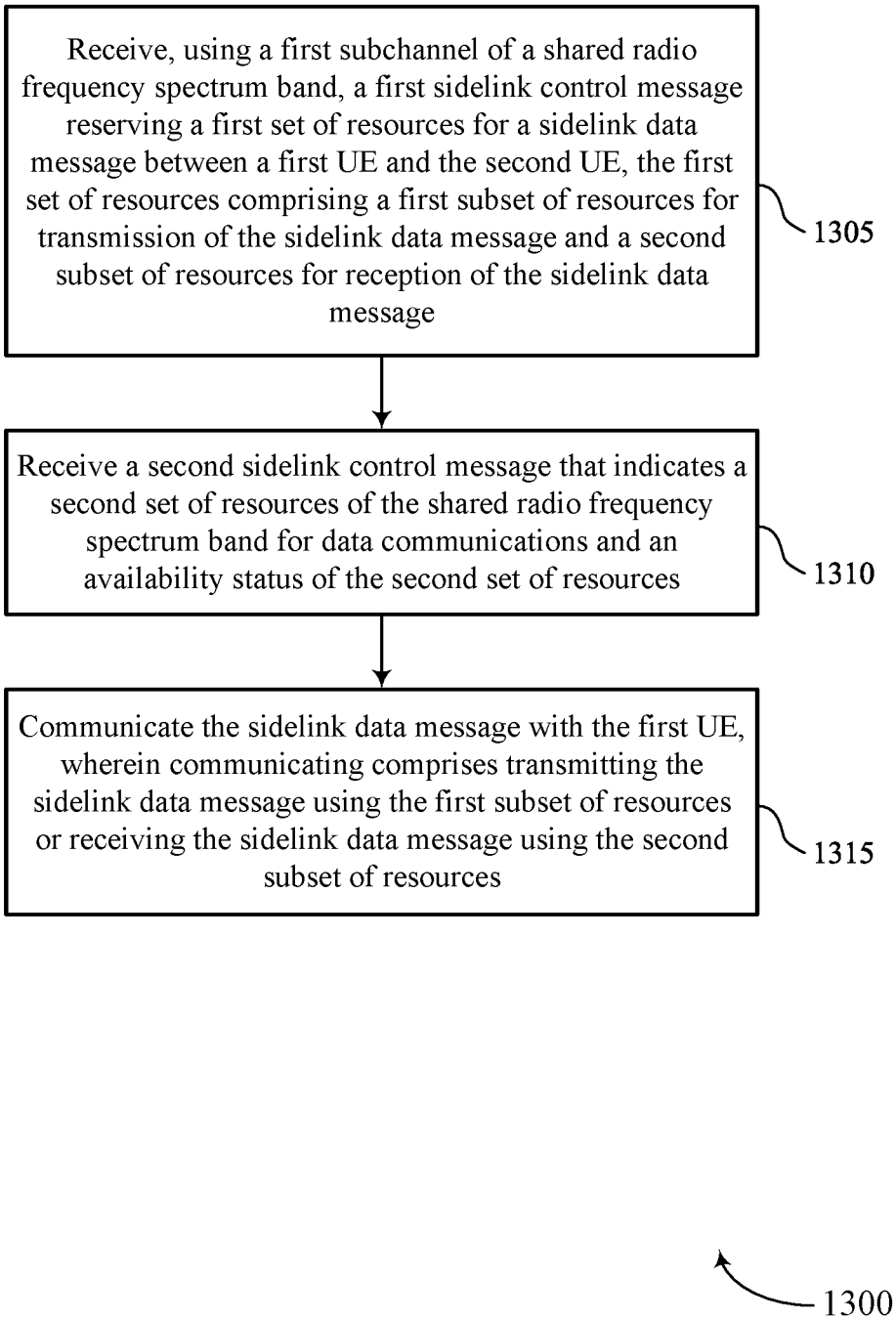

FIG. 13 shows a flowchart illustrating a method 1300 in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving, using a first subchannel of a shared radio frequency spectrum band, a first sidelink control message reserving a first set of resources for a sidelink data message between a first UE and the second UE, the first set of resources including a first subset of resources for transmission of the sidelink data message and a second subset of resources for reception of the sidelink data message. The operations of 1305 may be performed in accordance with examples as disclosed herein. In some examples, aspects of the operations of 1305 may be performed by an SCI component 930 as described with reference to FIG. 9.

At 1310, the method may include receiving a second sidelink control message that indicates a second set of resources of the shared radio frequency spectrum band for data communications and an availability status of the second set of resources. The operations of 1310 may be performed in accordance with examples as disclosed herein. In some examples, aspects of the operations of 1310 may be performed by an ASCI component 935 as described with reference to FIG. 9.

At 1315, the method may include communicating the sidelink data message with the first UE, where communicating includes transmitting the sidelink data message using the first subset of resources or receiving the sidelink data message using the second subset of resources. The operations of 1315 may be performed in accordance with examples as disclosed herein. In some examples, aspects of the operations of 1315 may be performed by a sidelink data component 940 as described with reference to FIG. 9.

Figure 14:
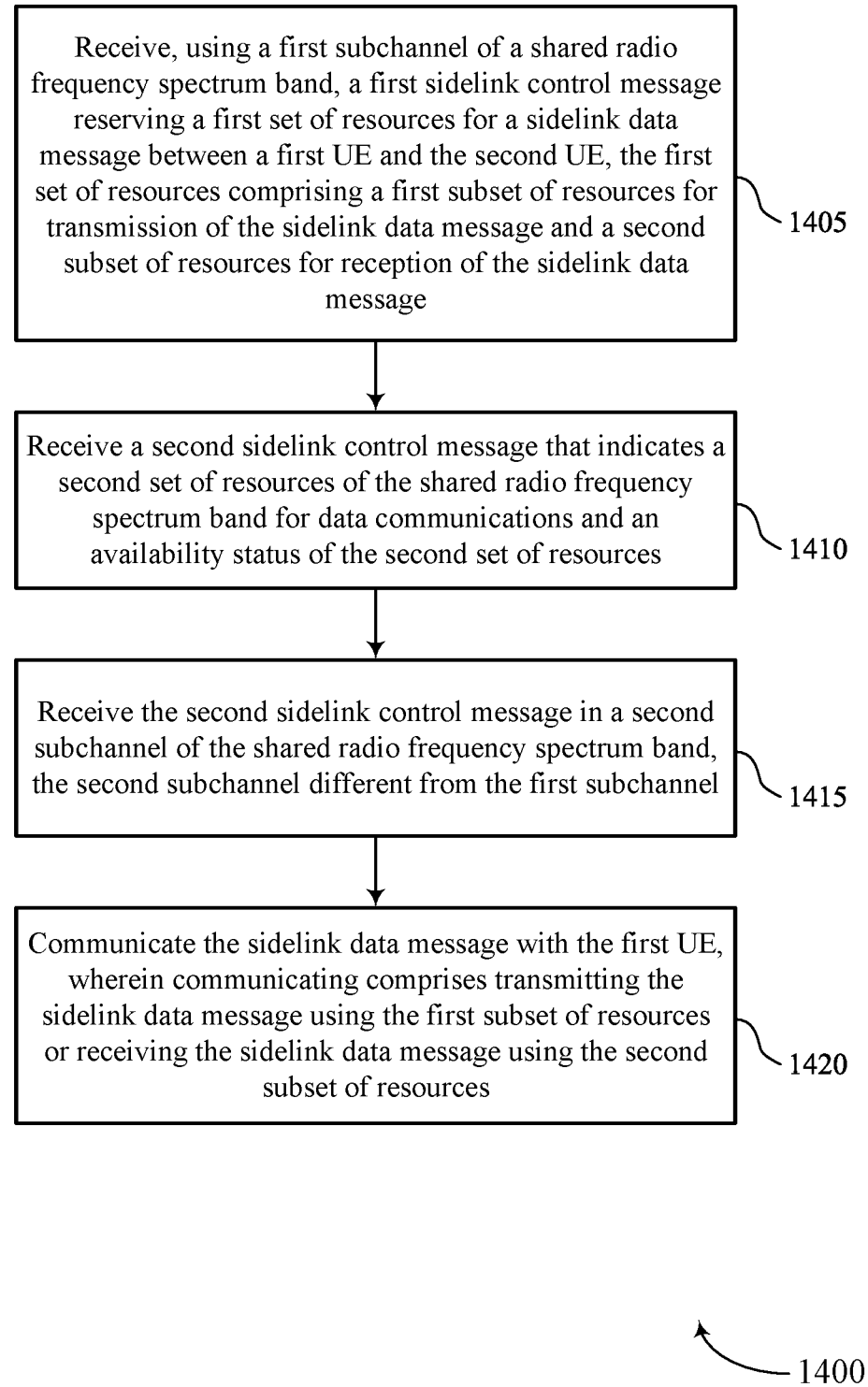

FIG. 14 shows a flowchart illustrating a method 1400 in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include receiving, using a first subchannel of a shared radio frequency spectrum band, a first sidelink control message reserving a first set of resources for a sidelink data message between a first UE and the second UE, the first set of resources including a first subset of resources for transmission of the sidelink data message and a second subset of resources for reception of the sidelink data message. The operations of 1405 may be performed in accordance with examples as disclosed herein. In some examples, aspects of the operations of 1405 may be performed by an SCI component 930 as described with reference to FIG. 9.

At 1410, the method may include receiving a second sidelink control message that indicates a second set of resources of the shared radio frequency spectrum band for data communications and an availability status of the second set of resources. The operations of 1410 may be performed in accordance with examples as disclosed herein. In some examples, aspects of the operations of 1410 may be performed by an ASCI component 935 as described with reference to FIG. 9.

At 1415, the method may include receiving the second sidelink control message in a second subchannel of the shared radio frequency spectrum band, the second subchannel different from the first subchannel. The operations of 1415 may be performed in accordance with examples as disclosed herein. In some examples, aspects of the operations of 1415 may be performed by an ASCI component 935 as described with reference to FIG. 9.

At 1420, the method may include communicating the sidelink data message with the first UE, where communicating includes transmitting the sidelink data message using the first subset of resources or receiving the sidelink data message using the second subset of resources. The operations of 1420 may be performed in accordance with examples as disclosed herein. In some examples, aspects of the operations of 1420 may be performed by a sidelink data component 940 as described with reference to FIG. 9.

Figure 15:
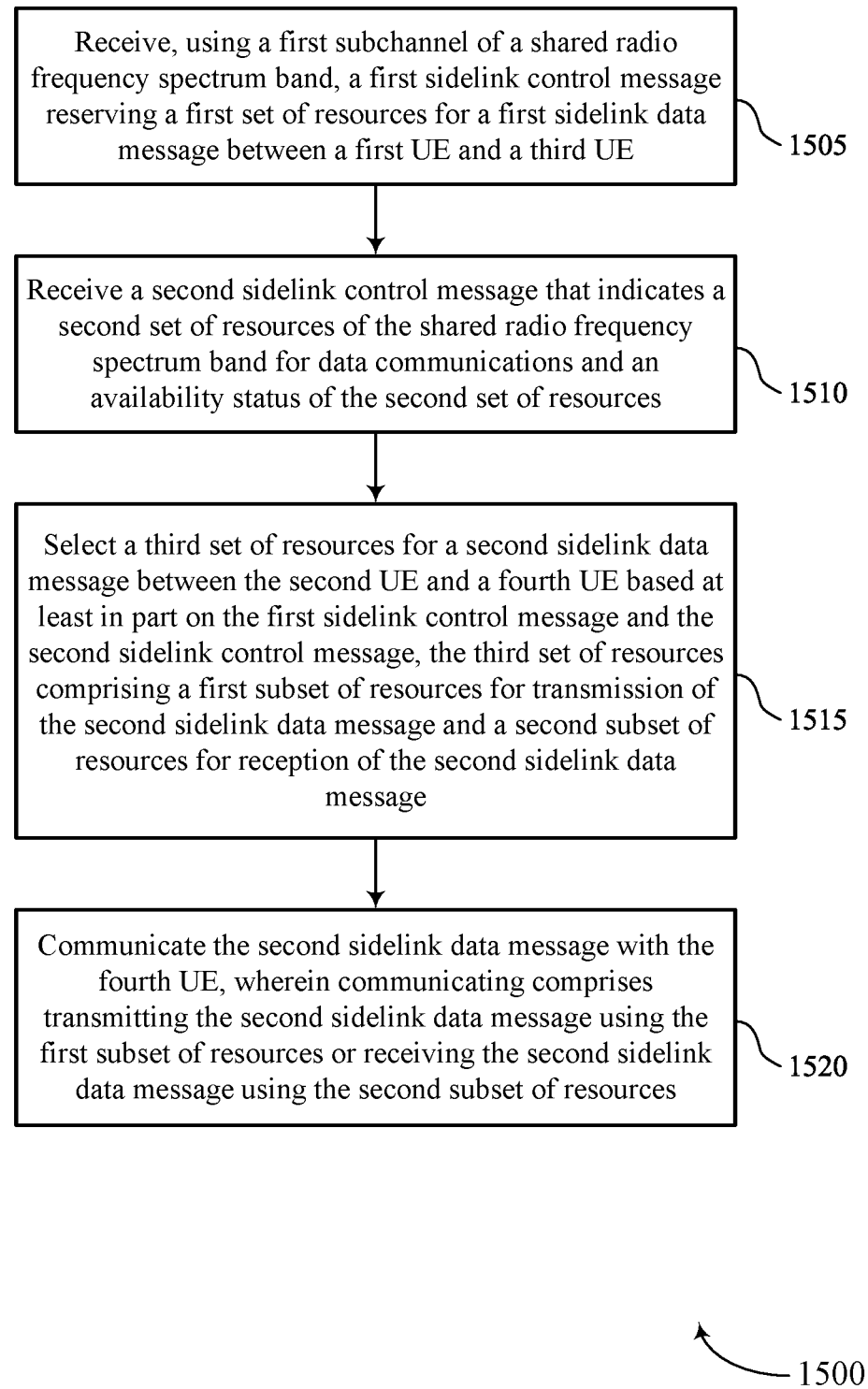

FIG. 15 shows a flowchart illustrating a method 1500 in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, using a first subchannel of a shared radio frequency spectrum band, a first sidelink control message reserving a first set of resources for a first sidelink data message between a first UE and a third UE. The operations of 1505 may be performed in accordance with examples as disclosed herein. In some examples, aspects of the operations of 1505 may be performed by an SCI component 930 as described with reference to FIG. 9.

At 1510, the method may include receiving a second sidelink control message that indicates a second set of resources of the shared radio frequency spectrum band for data communications and an availability status of the second set of resources. The operations of 1510 may be performed in accordance with examples as disclosed herein. In some examples, aspects of the operations of 1510 may be performed by an ASCI component 935 as described with reference to FIG. 9.

At 1515, the method may include selecting a third set of resources for a second sidelink data message between the second UE and a fourth UE based on the first sidelink control message and the second sidelink control message, the third set of resources including a first subset of resources for transmission of the second sidelink data message and a second subset of resources for reception of the second sidelink data message. The operations of 1515 may be performed in accordance with examples as disclosed herein. In some examples, aspects of the operations of 1515 may be performed by a resource component 925 as described with reference to FIG. 9.

At 1520, the method may include communicating the second sidelink data message with the fourth UE, where communicating includes transmitting the second sidelink data message using the first subset of resources or receiving the second sidelink data message using the second subset of resources. The operations of 1520 may be performed in accordance with examples as disclosed herein. In some examples, aspects of the operations of 1520 may be performed by a sidelink data component 940 as described with reference to FIG. 9.

The following provides an overview of aspects of the present disclosure:

Aspect 1: A method for wireless communications at a first UE, comprising: determining a first set of resources of a shared radio frequency spectrum band for sidelink communications, the first set of resources comprising a first subset of resources for transmission of a sidelink data message between the first UE and a second UE and a second subset of resources for reception of the sidelink data message; transmitting, using a first subchannel of the shared radio frequency spectrum band, a first sidelink control message reserving the first set of resources for the sidelink data message; transmitting a second sidelink control message that indicates a second set of resources of the shared radio frequency spectrum band for data communications and an availability status of the second set of resources; and communicating the sidelink data message with the second UE, wherein communicating comprises transmitting the sidelink data message using the first subset of resources or receiving the sidelink data message using the second subset of resources.

Aspect 2: The method of aspect 1, further comprising: transmitting a plurality of additional sidelink control messages, each indicating respective sets of resources for data communications and corresponding availability statuses.

Aspect 3: The method of any of aspects 1 through 2, further comprising: transmitting the second sidelink control message in a second subchannel of the shared radio frequency spectrum band, the second subchannel different from the first subchannel.

Aspect 4: The method of aspect 3, wherein the first subchannel has a lowest subchannel index of a set of subchannels including the first subchannel and the second subchannel.

Aspect 5: The method of any of aspects 1 through 2, further comprising: transmitting the second sidelink control message in the first subchannel of the shared radio frequency spectrum band.

Aspect 6: The method of any of aspects 1 through 5, further comprising: transmitting a third sidelink control message that indicates the second set of resources of the shared radio frequency spectrum band, the second set of resources comprising an aggregate of resources reserved for data communications by one or more transmitting devices.

Aspect 7: The method of any of aspects 1 through 6, further comprising: transmitting an indication of the second sidelink control message in the first sidelink control message, wherein the indication is based at least in part on a scrambling sequence of the first sidelink control message configured for the second sidelink control message.

Aspect 8: The method of any of aspects 1 through 7, further comprising: determining a resource configuration for the second sidelink control message, wherein the resource configuration indicates a configured number of subchannels for the second sidelink control message; and transmitting the second sidelink control message in a set of subchannels according to the configured number of subchannels.

Aspect 9: The method of aspect 8, further comprising: transmitting, to the second UE, the resource configuration indicating the configured number of subchannels for the second sidelink control message.

Aspect 10: The method of any of aspects 1 through 9, further comprising: determining a set of resources available for data communications based at least in part on the first sidelink control message, the second sidelink control message, and one or more other control messages associated with data communications; and transmitting one or more additional sidelink control channels indicating the set of resources available for data communications, wherein each of the one or more additional sidelink control channels is transmitted in a respective subchannel of a set of subchannels including the first subchannel.

Aspect 11: The method of any of aspects 1 through 10, wherein determining the first set of resources comprises: monitoring for a control message from a wireless device; decoding the control message to identify resources indicated as reserved by the control message; and determining the first set of resources based at least in part on the resources indicated as reserved by the control message, the first set of resources nonoverlapping with the resources indicated as reserved by the control message.

Aspect 12: The method of any of aspects 1 through 11, wherein the first sidelink control message comprises a first number of slots in the first subchannel and the second sidelink control message comprises a second number of slots different from the first number of slots.

Aspect 13: The method of any of aspects 1 through 12, wherein the first sidelink control message comprises a first number of slots in the first subchannel and the second sidelink control message comprises a second number of slots that is the same as the first number of slots.

Aspect 14: The method of any of aspects 1 through 13, wherein the availability status comprises an indication that the second set of resources is reserved for data communications, the second set of resources is available for the data communications, or a sensing report indicating that the second set of resources is for collision avoidance.

Aspect 15: A method for wireless communications at a second UE, comprising: receiving, using a first subchannel of a shared radio frequency spectrum band, a first sidelink control message reserving a first set of resources for a sidelink data message between a first UE and the second UE, the first set of resources comprising a first subset of resources for transmission of the sidelink data message and a second subset of resources for reception of the sidelink data message; receiving a second sidelink control message that indicates a second set of resources of the shared radio frequency spectrum band for data communications and an availability status of the second set of resources; and communicating the sidelink data message with the first UE, wherein communicating comprises transmitting the sidelink data message using the first subset of resources or receiving the sidelink data message using the second subset of resources.

Aspect 16: The method of aspect 15, further comprising: receiving a plurality of additional sidelink control messages, each indicating respective sets of resources for data communications and corresponding availability statuses.

Aspect 17: The method of any of aspects 15 through 16, further comprising: receiving the second sidelink control message in a second subchannel of the shared radio frequency spectrum band, the second subchannel different from the first subchannel.

Aspect 18: The method of aspect 17, wherein the first subchannel has a lowest subchannel index of a set of subchannels including the first subchannel and the second subchannel.

Aspect 19: The method of any of aspects 15 through 16, further comprising: receiving the second sidelink control message in the first subchannel of the shared radio frequency spectrum band.

Aspect 20: The method of any of aspects 15 through 19, further comprising: receiving a third sidelink control message that indicates the second set of resources of the shared radio frequency spectrum band, the second set of resources comprising an aggregate of resources reserved for data communications by one or more transmitting devices.

Aspect 21: The method of any of aspects 15 through 20, further comprising: receiving an indication of the second sidelink control message in the first sidelink control message, wherein the indication is based at least in part on a scrambling sequence of the first sidelink control message configured for the second sidelink control message.

Aspect 22: The method of any of aspects 15 through 21, further comprising: determining a resource configuration for the second sidelink control message, wherein the resource configuration indicates a configured number of subchannels for the second sidelink control message; and monitoring for the second sidelink control message in a set of subchannels according to the configured number of subchannels.

Aspect 23: The method of any of aspects 15 through 22, further comprising: receiving one or more additional sidelink control channels indicating a set of resources available for data communications, wherein each of the one or more additional sidelink control channels is received in a respective subchannel of a set of subchannels including the first subchannel; and determining resources for a subsequent data communication by the second UE based at least in part on the set of resources available for data communications.

Aspect 24: The method of any of aspects 15 through 23, wherein the first sidelink control message comprises a first number of slots in the first subchannel and the second sidelink control message comprises a second number of slots different from the first number of slots.

Aspect 25: The method of any of aspects 15 through 24, wherein the first sidelink control message comprises a first number of slots in the first subchannel and the second sidelink control message comprises a second number of slots that is the same as the first number of slots.

Aspect 26: The method of any of aspects 15 through 25, wherein the availability status comprises an indication that the second set of resources are reserved for the data communications, the second set of resources are recommended for the data communications, or a sensing report associated with the second set of resources.

Aspect 27: A method for wireless communications at a second UE, comprising: receiving, using a first subchannel of a shared radio frequency spectrum band, a first sidelink control message reserving a first set of resources for a first sidelink data message between a first UE and a third UE; receiving a second sidelink control message that indicates a second set of resources of the shared radio frequency spectrum band for data communications and an availability status of the second set of resources; selecting a third set of resources for a second sidelink data message between the second UE and a fourth UE based at least in part on the first sidelink control message and the second sidelink control message, the third set of resources comprising a first subset of resources for transmission of the second sidelink data message and a second subset of resources for reception of the second sidelink data message; and communicating the second sidelink data message with the fourth UE, wherein communicating comprises transmitting the second sidelink data message using the first subset of resources or receiving the second sidelink data message using the second subset of resources.

Aspect 28: The method of aspect 27, further comprising: refraining from communicating the second sidelink data message using the first set of resources and the second set of resources based at least in part on the availability status indicating that the second set of resources is reserved for data communications or associated with collision avoidance.

Aspect 29: The method of any of aspects 27 through 28, wherein the first sidelink control message comprises an indication of the second sidelink control message.

Aspect 30: An apparatus for wireless communications at a first UE, comprising a processor; memory coupled with the processor; and instructions stored in the memory and executable by the processor to cause the apparatus to perform a method of any of aspects 1 through 14.

Aspect 31: An apparatus for wireless communications at a first UE, comprising at least one means for performing a method of any of aspects 1 through 14.

Aspect 32: A non-transitory computer-readable medium storing code for wireless communications at a first UE, the code comprising instructions executable by a processor to perform a method of any of aspects 1 through 14.

Aspect 33: An apparatus for wireless communications at a second UE, comprising a processor; memory coupled with the processor; and instructions stored in the memory and executable by the processor to cause the apparatus to perform a method of any of aspects 15 through 26.

Aspect 34: An apparatus for wireless communications at a second UE, comprising at least one means for performing a method of any of aspects 15 through 26.

Aspect 35: A non-transitory computer-readable medium storing code for wireless communications at a second UE, the code comprising instructions executable by a processor to perform a method of any of aspects 15 through 26.

Aspect 36: An apparatus for wireless communications at a second UE, comprising a processor; memory coupled with the processor; and instructions stored in the memory and executable by the processor to cause the apparatus to perform a method of any of aspects 27 through 29.

Aspect 37: An apparatus for wireless communications at a second UE, comprising at least one means for performing a method of any of aspects 27 through 29.

Aspect 38: A non-transitory computer-readable medium storing code for wireless communications at a second UE, the code comprising instructions executable by a processor to perform a method of any of aspects 27 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
transmitting, using a first subchannel of a shared radio frequency spectrum band, a first sidelink control message reserving a first set of resources of the shared radio frequency spectrum band for sidelink communications, the first set of resources comprising a first subset of resources for transmission of a sidelink data message between the first UE and a second UE and a second subset of resources for reception of the sidelink data message;
transmitting a second sidelink control message that indicates to at least a third UE that a second set of resources of the shared radio frequency spectrum band for data communications are reserved for reception of the data communications at the first UE in accordance with an availability status of the second set of resources, wherein the second set of resources comprises at least the second subset of resources; and
communicating the sidelink data message with the second UE, wherein communicating comprises transmitting the sidelink data message using the first subset of resources or receiving the sidelink data message using the second subset of resources.

2. The method of claim 1, further comprising:
transmitting a plurality of additional sidelink control messages, each indicating respective sets of resources for the data communications and corresponding availability statuses.

3. The method of claim 1, further comprising:
transmitting the second sidelink control message in a second subchannel of the shared radio frequency spectrum band, the second subchannel different from the first subchannel.

4. The method of claim 3, wherein the first subchannel has a lowest subchannel index of a set of subchannels including the first subchannel and the second subchannel.

5. The method of claim 1, further comprising:
transmitting the second sidelink control message in the first subchannel of the shared radio frequency spectrum band.

6. The method of claim 1, further comprising:
transmitting a third sidelink control message that indicates the second set of resources of the shared radio frequency spectrum band, the second set of resources comprising an aggregate of resources reserved for the reception of the data communications at the first UE by one or more transmitting devices.

7. The method of claim 1, further comprising:
transmitting an indication of the second sidelink control message in the first sidelink control message, wherein the indication is based at least in part on a scrambling sequence of the first sidelink control message configured for the second sidelink control message.

8. The method of claim 1, further comprising:
transmitting the second sidelink control message in a set of subchannels according to a configured number of subchannels.

9. The method of claim 8, further comprising:
transmitting, to the second UE, a resource configuration indicating the configured number of subchannels for the second sidelink control message.

10. The method of claim 1, further comprising:
transmitting one or more additional sidelink control channels indicating a set of resources available for the data communications, the set of resources available for the data communications determined based at least in part on the first sidelink control message, the second sidelink control message, and one or more other control messages associated with the data communications, wherein each of the one or more additional sidelink control channels is transmitted in a respective subchannel of a set of subchannels including the first subchannel.

11. The method of claim 1, further comprising:
monitoring for a control message from a wireless device; and
decoding the control message to identify resources indicated as reserved by the control message, wherein the first set of resources is determined based at least in part on the resources indicated as reserved by the control message, the first set of resources nonoverlapping with the resources indicated as reserved by the control message.

12. The method of claim 1, wherein the first sidelink control message comprises a first number of slots in the first subchannel and the second sidelink control message comprises a second number of slots different from the first number of slots.

13. The method of claim 1, wherein the first sidelink control message comprises a first number of slots in the first subchannel and the second sidelink control message comprises a second number of slots that is the same as the first number of slots.

14. The method of claim 1, wherein the availability status comprises an indication that the second set of resources is reserved for the data communications, the second set of resources is available for the data communications, or a sensing report indicating that the second set of resources is for collision avoidance.

15. A method for wireless communications at a second user equipment (UE), comprising:
receiving, using a first subchannel of a shared radio frequency spectrum band, a first sidelink control message reserving a first set of resources for a sidelink data message between a first UE and the second UE, the first set of resources comprising a first subset of resources for transmission of the sidelink data message and a second subset of resources for reception of the sidelink data message;
receiving a second sidelink control message that indicates a second set of resources of the shared radio frequency spectrum band for data communications are reserved for reception of the data communications at the first UE in accordance with an availability status of the second set of resources, wherein the second set of resources comprises at least the second subset of resources; and
communicating the sidelink data message with the first UE, wherein communicating comprises transmitting the sidelink data message using the first subset of resources or receiving the sidelink data message using the second subset of resources.

16. The method of claim 15, further comprising:
receiving a plurality of additional sidelink control messages, each indicating respective sets of resources for the data communications and corresponding availability statuses.

17. The method of claim 15, further comprising:
receiving the second sidelink control message in a second subchannel of the shared radio frequency spectrum band, the second subchannel different from the first subchannel.

18. The method of claim 17, wherein the first subchannel has a lowest subchannel index of a set of subchannels including the first subchannel and the second subchannel.

19. The method of claim 15, further comprising:
receiving the second sidelink control message in the first subchannel of the shared radio frequency spectrum band.

20. The method of claim 15, further comprising:
receiving a third sidelink control message that indicates the second set of resources of the shared radio frequency spectrum band, the second set of resources comprising an aggregate of resources reserved for the reception of the data communications at the first UE by one or more transmitting devices.

21. The method of claim 15, further comprising:
receiving an indication of the second sidelink control message in the first sidelink control message, wherein the indication is based at least in part on a scrambling sequence of the first sidelink control message configured for the second sidelink control message.

22. The method of claim 15, further comprising:
monitoring for the second sidelink control message in a set of subchannels according to a configured number of subchannels.

23. The method of claim 15, further comprising:
receiving one or more additional sidelink control channels indicating a set of resources available for the data communications, wherein each of the one or more additional sidelink control channels is received in a respective subchannel of a set of subchannels including the first subchannel; and
determining resources for a subsequent data communication by the second UE based at least in part on the set of resources available for the data communications.

24. The method of claim 15, wherein the first sidelink control message comprises a first number of slots in the first subchannel and the second sidelink control message comprises a second number of slots different from the first number of slots.

25. The method of claim 15, wherein the first sidelink control message comprises a first number of slots in the first subchannel and the second sidelink control message comprises a second number of slots that is the same as the first number of slots.

26. The method of claim 15, wherein the availability status comprises an indication that the second set of resources are reserved for the data communications, the second set of resources are recommended for the data communications, or a sensing report associated with the second set of resources.

27. A method for wireless communications at a second user equipment (UE), comprising:
receiving, using a first subchannel of a shared radio frequency spectrum band, a first sidelink control message reserving a first set of resources for a first sidelink data message between a first UE and a third UE;
receiving a second sidelink control message that indicates a second set of resources of the shared radio frequency spectrum band for data communications and an availability status of the second set of resources;
selecting a third set of resources for a second sidelink data message between the second UE and a fourth UE based at least in part on the first sidelink control message and the second sidelink control message, the third set of resources comprising a first subset of resources for transmission of the second sidelink data message and a second subset of resources for reception of the second sidelink data message; and
communicating the second sidelink data message with the fourth UE, wherein communicating comprises transmitting the second sidelink data message using the first subset of resources or receiving the second sidelink data message using the second subset of resources.

28. The method of claim 27, further comprising:
refraining from communicating the second sidelink data message using the first set of resources and the second set of resources based at least in part on the availability status indicating that the second set of resources is reserved for the data communications or associated with collision avoidance.

29. The method of claim 27, wherein the first sidelink control message comprises an indication of the second sidelink control message.

30. An apparatus for wireless communications at a first user equipment (UE), comprising:
a processor;
memory coupled with the processor; and
instructions stored in the memory and executable by the processor to cause the apparatus to:
transmit, using a first subchannel of a shared radio frequency spectrum band, a first sidelink control message reserving a first set of resources of the shared radio frequency spectrum band for sidelink communications, the first set of resources comprising a first subset of resources for transmission of a sidelink data message between the first UE and a second UE and a second subset of resources for reception of the sidelink data message;
transmit a second sidelink control message that indicates to at least a third UE that a second set of resources of the shared radio frequency spectrum band for data communications are reserved for reception of the data communications at the first UE in accordance with an availability status of the second set of resources, wherein the second set of resources comprises at least the second subset of resources; and
communicate the sidelink data message with the second UE, wherein communicating comprises transmitting the sidelink data message using the first subset of resources or receiving the sidelink data message using the second subset of resources.

* * * * *